(12) United States Patent
Omeragic et al.

(10) Patent No.: US 11,286,763 B2
(45) Date of Patent: Mar. 29, 2022

(54) DRILLING WITH INFORMATION CHARACTERIZING LATERAL HETEROGENEITIES BASED ON DEEP DIRECTIONAL RESISTIVITY MEASUREMENTS

(71) Applicant: SCHLUMBERGER TECHNOLOGY CORPORATION, Sugar Land, TX (US)

(72) Inventors: Dzevat Omeragic, Lexington, MA (US); Michael Thiel, Cambridge, MA (US); Niloofar Farnoosh, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 547 days.

(21) Appl. No.: 16/071,922

(22) PCT Filed: Jan. 24, 2017

(86) PCT No.: PCT/US2017/014639
§ 371 (c)(1),
(2) Date: Jul. 23, 2018

(87) PCT Pub. No.: WO2017/132098
PCT Pub. Date: Aug. 3, 2017

(65) Prior Publication Data
US 2019/0063205 A1 Feb. 28, 2019

Related U.S. Application Data

(60) Provisional application No. 62/286,954, filed on Jan. 25, 2016.

(51) Int. Cl.
*E21B 44/00* (2006.01)
*E21B 47/024* (2006.01)
(Continued)

(52) U.S. Cl.
CPC ............... *E21B 44/00* (2013.01); *E21B 7/04* (2013.01); *E21B 41/0092* (2013.01);
(Continued)

(58) Field of Classification Search
CPC .............. G01V 3/38; G01V 3/18; G01V 3/20; G01V 3/22; G01V 3/24; G01V 3/26; G01V 3/30;
(Continued)

(56) References Cited

U.S. PATENT DOCUMENTS 3,690,164 A * 9/1972 Gabillard ................. G01V 1/42
324/334
3,702,009 A * 10/1972 Baldwin, Jr. ........... G06F 17/13
703/2

(Continued)

FOREIGN PATENT DOCUMENTS

EP           2367029 A2 *  9/2011  ............... G01V 3/30
WO    WO-2009055152 A1 *  4/2009  ............. G01V 11/00

(Continued)

OTHER PUBLICATIONS

Seydoux, Jean, et al. Full 3D Deep Directional Resistivity Measurements Optimize Well Placement and Provide Reservoir-Scale Imaging While Drilling. SPWLA 55th Annual Logging Symposium, May 18-22, 2014. Copyright 2014, held jointly by the Society of Petrophysicists and Well Log Analysts (SPWLA). (Year: 2014).*

(Continued)

*Primary Examiner* — Rehana Perveen
*Assistant Examiner* — Daniel E Miller
(74) *Attorney, Agent, or Firm* — Trevor G. Grove

(57) ABSTRACT

A method and system is provided for drilling a wellbore that traverses a geological formation using a drilling tool. The method and system derives a plurality of formation models that characterize the geological formation. The number of
(Continued)

formation models represent layer structures with a heterogeneity (such a fault) offset laterally at variable distance relative to position of the drilling tool. Simulated directional resistivity data of the drilling tool is derived from the plurality of formation models. Certain simulated directional resistivity data are combined or selected for processing as multi-dimensional cross-plot data. Measured directional resistivity data obtained by the drilling tool is used to evaluate the multi-dimensional cross-plot data to determine distance of the heterogeneity relative to position of the drilling tool. The determined distance of the heterogeneity relative to position of the drilling tool can used for controlling drilling direction and can be stored in computer memory and used in other reservoir analysis.

25 Claims, 17 Drawing Sheets

(51) Int. Cl.
| | | |
|---|---|---|
| *E21B 7/04* | (2006.01) | |
| *G01V 3/28* | (2006.01) | |
| *G01V 3/30* | (2006.01) | |
| *G01V 3/18* | (2006.01) | |
| *E21B 41/00* | (2006.01) | |
| *G01V 99/00* | (2009.01) | |

(52) U.S. Cl.
CPC .............. *E21B 47/024* (2013.01); *G01V 3/18* (2013.01); *G01V 3/28* (2013.01); *G01V 3/30* (2013.01); *G01V 99/005* (2013.01)

(58) Field of Classification Search
CPC .............. G01V 3/00; G01V 3/06; G01V 3/08; G01V 3/083; G01V 2003/086; G01V 3/088; G01V 3/101; G01V 3/102; G01V 3/103; G01V 3/104; G01V 3/105; G01V 3/106; G01V 3/107; G01V 3/108; E21B 2200/20; E21B 2200/22; E21B 41/00; E21B 41/0092; E21B 47/00; E21B 27/0228; E21B 49/087; E21B 49/00; E21B 49/003; E21B 44/00
See application file for complete search history.

(56) References Cited

U.S. PATENT DOCUMENTS

| | | | | |
|---|---|---|---|---|
| 3,808,521 | A * | 4/1974 | Pickard | G01R 27/18 324/357 |
| 3,978,396 | A * | 8/1976 | Inouye | G01V 3/105 324/337 |
| 6,594,584 | B1 | 7/2003 | Omeragic et al. | |
| 7,093,672 | B2 | 8/2006 | Seydoux et al. | |
| 7,366,616 | B2 | 4/2008 | Bennett et al. | |
| 7,382,135 | B2 * | 6/2008 | Li | G01V 3/30 324/338 |
| 8,489,375 | B2 | 7/2013 | Omeragic et al. | |
| 8,626,446 | B2 | 1/2014 | Dong et al. | |
| 8,736,270 | B2 * | 5/2014 | Seydoux | G01V 3/28 324/338 |
| 9,411,068 | B2 * | 8/2016 | Bittar | G01V 3/30 |
| 10,036,826 | B2 | 7/2018 | Thiel et al. | |
| 2002/0079899 | A1 * | 6/2002 | Frey | E21B 47/13 324/338 |
| 2003/0184302 | A1 * | 10/2003 | Omeragic | G01V 3/28 324/338 |
| 2003/0200029 | A1 * | 10/2003 | Omeragic | G01V 3/30 702/6 |
| 2005/0140373 | A1 | 6/2005 | Li et al. | |
| 2010/0122847 | A1 | 5/2010 | Xia et al. | |
| 2012/0298420 | A1 * | 11/2012 | Seydoux | E21B 47/02 175/26 |
| 2013/0320985 | A1 * | 12/2013 | Liu | G01V 3/28 324/339 |

FOREIGN PATENT DOCUMENTS

| | | |
|---|---|---|
| WO | 2014098840 A1 | 6/2014 |
| WO | 2017147217 A1 | 8/2017 |

OTHER PUBLICATIONS

Seydoux, Jean, "A Deep-Resistivity Logging-While-Drilling Device for Proactive Geosteering." (OnePetro, 2003) Paper presented at the Offshore Technology Conference, Houston, Texas, May 2003. doi: https://doi.org/10.4043/15126-MS (Year: 2003).*

Seydoux, J. et al. "Full 3D Deep Directional Resistivity Measurements Optimize Well Placement and Provide Reservoir-Scale Imaging While Drilling", Transactions of the 55th Annual SPWLA Logging Symposium, Abu Dhabi, UAE, 2014, 14 pages . . .

Habashy, T. M. et al., "A General Framework for Constraint Minimization for the Inversion of Electro-Magnetic Measurements", Progress in Electromagnetics Research, 2004, 46, pp. 265-312.

* cited by examiner

Apparent Azimuth - Bedding Orientation

First harmonic angle:

$$ANFH = \frac{1}{2} atan2(\sin ANFH1 + \sin ANFH2, \cos ANFH1 + \cos ANFH2)$$

ANFH = ½ atan2((XZ · YZ*) + (XZ* · YZ) + (ZX · ZY*) + (ZX* · ZY), (XZ · XZ*) + (ZX · ZX*) − (YZ · YZ*) − (ZY · ZY*))

ANFH1 = ½ atan2((XZ · YZ*) + (XZ* · YZ), (XZ · XZ*) − (YZ · YZ*))

ANFH2 = ½ atan2((ZX · ZY*) + (ZX* · ZY), (ZX · ZX*) − (ZY · ZY*))

Second harmonic angle:

ANSH = ¼ atan2(((XX − YY) · (XY − YX*) + ((XX − YY)* · (XY − YX)), ((XX − YY) · (XX − YY)*) − ((XY − YX) · (XY−YX)*))

DRILLING WITH INFORMATION CHARACTERIZING LATERAL HETEROGENEITIES BASED ON DEEP DIRECTIONAL RESISTIVITY MEASUREMENTS

CROSS-REFERENCE TO RELATED APPLICATIONS

This disclosure claims the benefit of U.S. Provisional Patent Application No. 62/286,954, filed on Jan. 25, 2016, herein incorporated by reference in its entirety.

FIELD

This disclosure relates generally to oil and gas well logging and directional drilling. More specifically, techniques are disclosed for enhancing well placement using logging-while-drilling (LWD) tool data.

BACKGROUND

Wellbores drilled through earth formations to extract petroleum or other hydrocarbon-based resources are frequently drilled along a substantially horizontal trajectory to increase the drainage area, or the length of the wellbore that is disposed within the reservoir. Often, the terms high angle/horizontal or HA/HZ, are used with these types of wellbores. Because hydrocarbon-bearing reservoirs are frequently located in layered subterranean earth formations, the position or placement of the substantially horizontal wellbore relative to the upper and lower boundaries of the reservoir will have a material effect on the productivity of the wellbore. This disclosure can be more generally directed to vertical and deviated wellbores.

Data on downhole conditions and movement of the drilling assembly can be collected during the drilling process. By collecting and processing such information during the drilling process, the driller can modify or correct key steps of the operation to optimize well placement. Schemes for collecting data of downhole conditions and movement of the drilling assembly during the drilling operation are commonly referred to as measurement-while-drilling ("MWD"). Similar techniques focusing more on the measurement of formation parameters during the drilling process are commonly referred to as logging-while-drilling ("LWD"). However, the terms MWD and LWD are often used interchangeably, and the use of either term in this disclosure will be understood to include both the collection of formation and borehole information as well as data on movement and placement of the drilling assembly.

The introduction of deep directional electro-magnetic (EM) logging tools has revolutionized wellbore placement. Specifically, the deep directional EM measurements enable proactive geo-steering, which allows control over the trajectory of the drilled wellbore such that it is maintained within the reservoir of interest or "pay zone." As a result, the trajectory of the drilled wellbore can be steered along a path defined by observed reservoir boundaries and fluid contacts rather than by preconceived geometries. Data from the LWD or MWD tools are used for real-time prediction and visualization of the layer structure of the formation surrounding the tool or drill string. Such real-time visualization allows operators to control the direction of the wellbore drilling operations in order to place or "land" the wellbore in a particular section of a reservoir. Wellbore placement optimization results in increased production by minimizing gas or water breakthrough, reducing side tracks, and managing drilling risk through better control of the wellbore placement.

Directional EM LWD tools are well suited for these geo-steering applications because of their relatively large lateral depth of investigation into the surrounding formation and azimuthal sensitivity. Directional EM LWD tools are available, such as Schlumberger's PeriScope™ and GeoSphere™ deep imaging LWD tools, which incorporate multiple tilted and transverse antennas in the drilling collar. The non-axial antennae obtain directional measurements that are used to determine distances to nearby boundaries and azimuthal orientation of formation boundaries in various mud types. These measurements are transmitted up-hole while-drilling, processed in real-time and displayed on a graphical interface (visualized) to provide information on distance to boundaries, formation resistivity and orientation. These EM LWD tools also include short antenna spacings with shallow depths of investigation (DOI), used to characterize the formation layers near the tool as well as longer antenna spacings with deep DOIs, used to image and characterize properties of formation layers farther away from the tool.

Current geo-steering solutions provide for two-dimensional and three-dimensional modeling and visualization of both shallow and deep formation properties (see commonly owned U.S. Pat. Nos. 6,594,584 and 7,366,616, incorporated herein by reference). However, faults and other heterogeneities of the formation that are offset laterally with respect to the wellbore drilled with the bottom-hole assembly including a deep directional EM LWD tool can cause artifacts and inconsistencies in measurement interpretation of directional EM responses assuming 1D formation model, which adversely affect the modeling of the formation. Accordingly, improved modeling techniques are needed for enhancing the ability to properly land and place wellbores with respect to faults and other heterogeneities that are offset laterally with respect to the deep directional EM LWD tool.

SUMMARY

The present disclosure provides a method and corresponding system that drills a wellbore that traverses a geological formation using a LWD tool, which involves deriving a number of formation models that characterize the geological formation. The number of formation models represents layer structures with one or more layers or boundaries offset vertically at variable distances above or below the LWD tool as well as a heterogeneity (such as a fault) offset laterally at variable distances relative to position of the LWD tool. Simulated directional resistivity data of the LWD tool is derived based on the number of formation models. Certain simulated directional resistivity data derived from the number of formation models are combined or selected for processing as multi-dimensional cross-plot data. For example, certain pairs of the simulated directional resistivity data derived from the number of formation models can be combined or selected for processing as two-dimensional cross-plot data. In another example, certain N-tuples of the simulated directional resistivity data derived from the number of formation models can be combined or selected for processing as N-dimensional cross-plot data, where N is an integer greater than three. The multidimensional cross-plot data is evaluated to determine distance of one or more layers or boundaries offset vertically relative to position of the LWD tool and/or distance of the heterogeneity offset laterally relative to position of the LWD tool. The determined distance of the heterogeneity relative to position of the LWD tool is used to control drilling direction of the LWD tool and possibly other reservoir analysis.

In embodiment(s), the determined distance of the one or more layers or boundaries relative to the position of the LWD tool can be used to generate a representation of position of the LWD tool relative to the one or more layers or boundaries, and the determined distance of the heterogeneity relative to position of the LWD tool can be used to generate a representation of position of the LWD tool relative to the heterogeneity. Such representation(s) can be stored in computer memory for output and display.

In embodiment(s), the determined distance of the heterogeneity relative to position of the LWD tool can be used to update a model of the geological formation.

In embodiment(s), the number of formation models can be two-dimensional models of the formation. In other embodiment(s), the number of formation models can be three-dimensional models of the formation.

In embodiment(s), the number of formation models can be derived from a one-dimensional model of the geological formation determined by inversion of tool response data. The one-dimensional model of the geological formation can define a number of formation layers and associated thicknesses and anisotropic resistivities. In one embodiment, the one-dimensional model of the geological formation can be determined by inversion of tool response data that is sensitive to resistivity of the formation in a direction that is generally orthogonal to the tool axis and orthogonal to the layering of the formation.

In embodiment(s), the multi-dimensional cross-plot data can be evaluated to identify the formation model that best matches measured directional resistivity data obtained by the LWD tool, and the distance of the heterogeneity relative to position of the tool for the identified formation model can be used to determine the distance of the heterogeneity relative to position of the LWD tool.

In embodiment(s), the multi-dimensional cross-plot data of different simulated directional resistivity data as derived from the same formation model can be evaluated for consistency in matching the measured directional resistivity data obtained by the LWD tool in order to identify the formation model that best matches the measured directional resistivity data obtained by the LWD tool.

In embodiment(s), the simulated directional resistivity data of the multi-dimensional cross-plot data can be derived by combining components of a mutual impedance tensor determined from simulated tool response data. Similarly, the measured directional resistivity data obtained by the LWD tool that is used to evaluate the multi-dimensional cross-plot data can be derived by combining components of a mutual impedance tensor determined from measured tool response data.

In embodiment(s), the multi-dimensional cross-plot data can be derived from particular simulated directional resistivity measurements that are sensitive to resistivity of the formation in a lateral direction relative to the tool (such as simulated U3DF directional resistivity measurements).

In embodiment(s), the multi-dimensional cross-plot data can be evaluated to identify the formation model that best matches the measured directional resistivity data obtained by the LWD tool, and the distance from the position of the LWD tool to the formation layer interface for the identified formation model can be used to determine the position of the LWD tool to the formation layer interface.

In embodiment(s), the multi-dimensional cross-plot data can be derived from particular simulated directional resistivity measurements that are sensitive to resistivity of the formation in a direction of the tool axis and orthogonal to the layering of the formation (such as simulated USD directional resistivity measurements and/or simulated UAD directional resistivity measurements).

DETAILED DESCRIPTION OF THE PREFERRED EMBODIMENTS

Figure 1A:
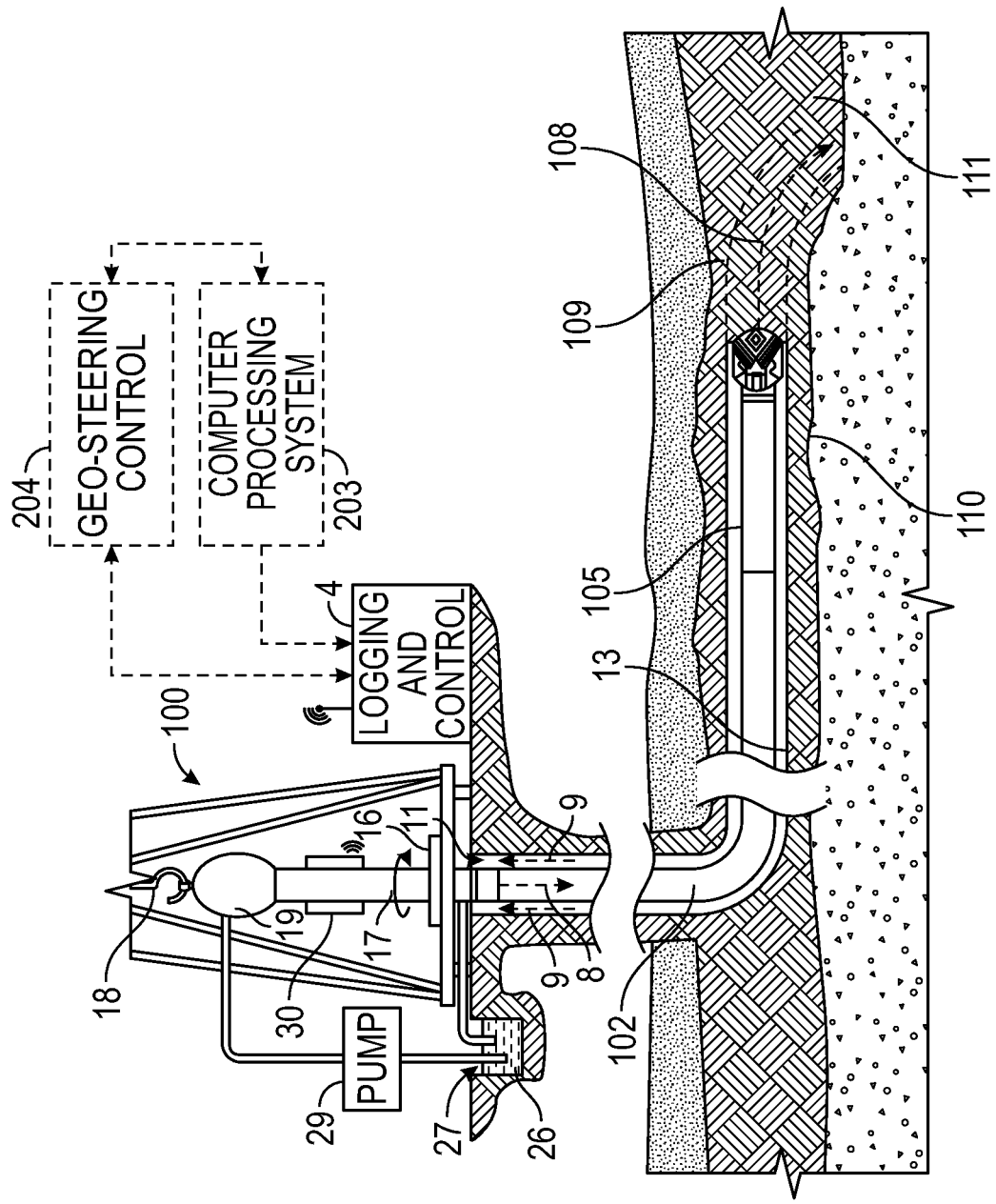
FIGS. 1A and 1B are schematic diagrams of a wellsite and a drilled horizontal well that embodies an exemplary logging-while-drilling (LWD) system according to the present disclosure.
Figure 1B:
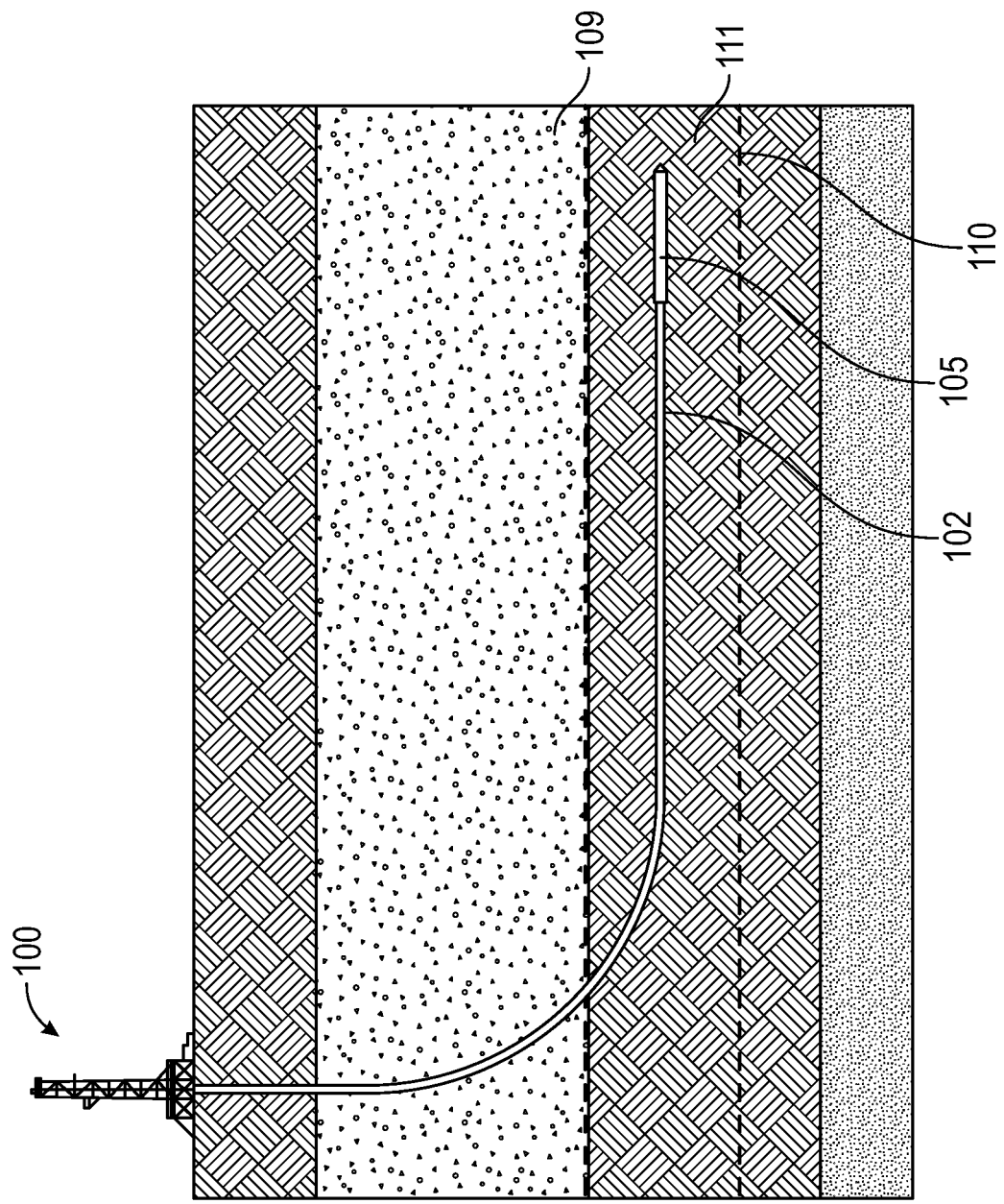

FIGS. 1A and 1B illustrate a while-drilling wellsite environment in which the disclosed modeling and inversion methods for enhanced well placement of high angle/horizontal (HA/HZ) wellbores can be employed. The wellsite can be onshore or offshore. In this exemplary system, a borehole or wellbore 11 is formed in a subsurface formation reservoir 111 by directional rotary drilling in a manner that is well known. A drill string 102 is suspended within the wellbore 11. A bottom hole assembly (BHA) 105 is rigidly coupled to the lower end of the drill string 102. The BHA 105 includes a drill bit at its lower end. The surface system includes platform and derrick assembly 100 positioned over the wellbore 11, where the assembly 100 includes a rotary table 16, kelly 17, hook 18 and rotary swivel 19 that cooperate to impart rotary motion to the drill string 102 and the drill bit of the BHA 105. The upper end of the drill string 102 is rigidly connected to the kelly 17. The kelly 17 is rotated by the rotary table 16, energized by means not shown, which imparts rotary motion to the drill string 102 and the drill bit. The kelly 17 and drill string 102 are suspended from the rotary swivel 19, which is supported by the hook 18. The rotary swivel 19 permits rotation of the kelly 17 and drill string 102 relative to the hook 18. As is well known, a top drive system or downhole motor could alternatively be used.

The wellsite of FIGS. 1A and 1B further includes drilling fluid or mud 26 stored in a pit 27. A pump 29 delivers the drilling fluid 26 to the interior of the drill string 102 via a port in the rotary swivel 19, causing the drilling fluid 26 to flow downwardly through the drill string 12 as indicated by the directional arrow 8. The drilling fluid 26 exits via ports in the drill bit of the BHA 105 and then circulates upwardly through the annulus region between the outside of the drill string 112 and the wall 13 of the wellbore 11, as indicated by the directional arrows 9. In this known manner, the drilling fluid 26 lubricates the drill bit and carries formation cuttings up to the surface. The formation cuttings can be removed from the drilling fluid before it is returned to the pit 27 for recirculation.

Figures 2A, 2B:
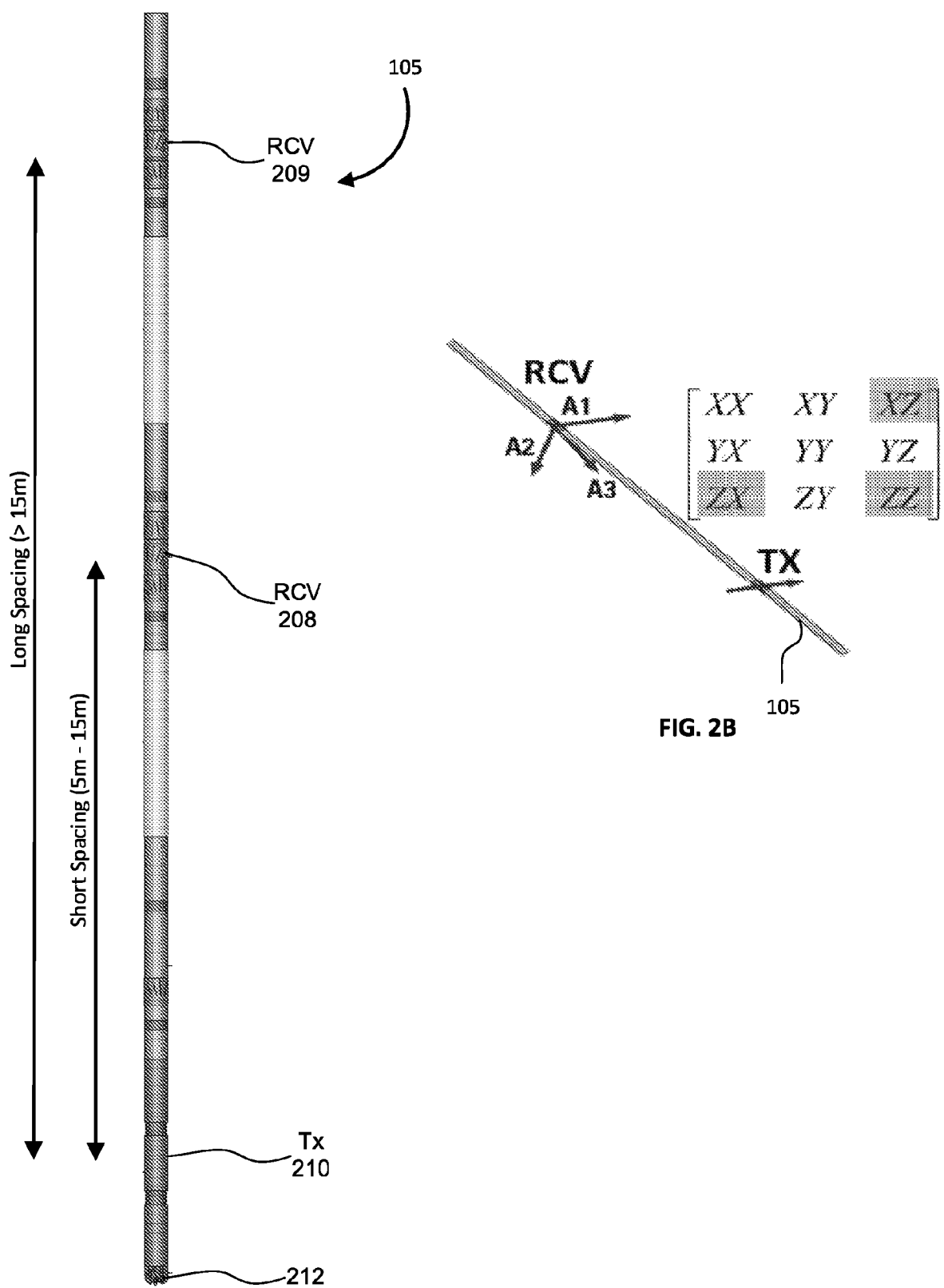
FIG. 2A shows exemplary modules of a LWD tool that is part of the bottom-hole assembly of the LWD system of FIGS. 1A and 1B.
FIG. 2B is a schematic illustration of exemplary tilted orientations of transmitter and receiver antennae of the LWD tool of FIG. 2A.

The BHA 105 includes a number of logging-while drilling (LWD) modules that operate as individual LWD tools or multiple modules operate together a part of a single LWD tool, possibly one or more measurement-while-drilling (MWD) modules, and a roto-steerable system that controls the drilling direction of the drill bit. An example BHA 105 is shown in FIG. 2A. The LWD modules of the LWD tool can be housed in a special type of drill collar as is known in the art. The LWD modules of the LWD tool includes capabilities for measuring and storing directional electromagnetic response data that is sensitive to resistivity profile of the formation in the vicinity of the BHA 105. The MWD module(s) can also be housed in a special type of drill collar as is known in the art. The MWD modules includes capabilities for measuring, processing, and storing information that characterizes position and direction of the drill string 102 and the drill bit of the BHA 105 as well as other drilling measurements, such as a weight-on-bit, torque, and shock and/or vibration.

The BHA 105 also includes a downhole telemetry subsystem that communicates data signals and control signals between the components of the BHA 105 (including the modules of the LWD tool) and a surface-located logging and control unit 4 via electronic subsystem 30. The downhole telemetry subsystem can employ a variety of telemetry methods, such as wired telemetry methods (e.g., drill pipe that incorporate telemetry cables or fiber optic cables) and wireless telemetry method (e.g., mud-pulse telemetry methods, electromagnetic telemetry methods, and acoustic telemetry methods). The downhole telemetry subsystem can also supply electrical power supply signals generated by a surface-located power source for supply to the components of the BHA 105. The BHA 105 can also include a power supply transformer/regulator for transforming the electric power supply signals supplied by the surface-located power source to appropriate levels suitable for use by the components of the BHA 105. In alternate embodiments, the BHA 105 can include an apparatus for generating electrical power for supply to the components of the BHA, such as a mud turbine generator powered by the flow of the drilling fluid. Other power and/or battery systems may be employed.

The wellsite of FIGS. 1A and 1B can also include a surface-located logging and control unit 4 that interfaces to computer processing system 203 via data communication links (shown as bidirectional dotted lines with arrows). A geo-steering control module 204 can interface to the logging and control unit 4 and to the computer processing system 203 via data communication links (shown as bidirectional dotted lines with arrows). The data communication links between the surface-located components can utilize wired and/or wireless connection via one or more communication lines. The communication topology between these surface-located components can be point-to-point, point-to-multi point or multipoint-to-point. The wired connection(s) can employ a variety of cable types or wires using diverse wired protocols (serial, wired Ethernet, fiber channel, etc.). The wireless connection(s) can employ a variety of diverse wireless protocols (such as IEEE 802.11, Bluetooth, Zigbee or any non-standard RF or optical communication technology).

The computer processing system 203 can be configured to perform the formation modeling and inversion methods as described herein, which are used to visualize and control the position and orientation of the BHA 105 during drilling operations such that wellbore 11 enters the formation reservoir 111 disposed between upper and lower layers 109, 110 respectively. The planned wellbore trajectory is shown as 108. The geo-steering control module 204 communicates with the logging and control unit 4 to control the position and orientation of the BHA 105 as determined by the operation of the computer processing system 203.

The methods, techniques and systems disclosed herein are intended to enhance the ability to dynamically control the position and orientation of the BHA 105 such that drill bit of the BHA 105 follows the planned wellbore trajectory 108 if practical. Furthermore, the position and orientation of the BHA 105 can be dynamically controlled in order to stay at an optimal distance with respect to reservoir boundaries and contacts, or to avoid nearby faults or other lateral heterogeneities that are offset laterally with respect to the BHA 105 along the planned wellbore trajectory 108 during the drilling process. Furthermore, the position and orientation of the BHA 105 can be dynamically controlled to adjust to the trajectory of the wellbore based on the detection and characterization of faults or other lateral heterogeneities that are offset laterally with respect to the BHA 105 during the drilling process. As used herein, a heterogeneity is a difference in composition and/or character (such as a difference in porosity and/or fluid saturation) of the rock matrix of the formation that results in an abrupt or significant change in resistivity of the rock matrix. For example, a heterogeneity can be a boundary, contact, or fault in the rock matrix.

Furthermore, the methods, techniques and systems disclosed herein can be used as part of post-drilling analysis and model refinement for improved reservoir characterization in vertical, deviated, high-angle, and horizontal wells.

Referring to FIG. 2A, an example BHA 105 incorporates a number of LWD modules that include a transmitter subassembly 210 and two receiver subassemblies 208 and 209. The transmitter subassembly 210 includes a transmitter antenna. The transmitter antenna of a directional EM tool is tilted, but the subassembly 210 may have a triaxial set of antennas, comprising of combination of axial, tilted and transverse antennas. Each of the receiver subassemblies 208 and 209 includes a receiver antennas configured to sense the EM field in order to make both short spacing (shallow DOI) and long spacing (deep DOI) directional EM measurements of the formation in the vicinity of the BHA 105. The receiver subassemblies 208 and 209 comprise of sets of three tilted antennas each as used in GeoSphere tools, but may comprise of combination of axial, tilted and transverse antennas, capable of sensing all components of EM fields by measuring magnetic field in different directions. The BHA 105 also includes a rotary steerable system and drill bit 212. The rotary steerable system can be used to dynamically adjust the direction of the drilling performed by the drill bit 212 under commands communicated from the geo-steering control module 204 via the logging and control unit 4 and the telemetry subsystem of the BHA 105. The method used by the rotary steerable system to dynamically adjust the direction of the drilling can generally fall into two categories, these being "push-the-bit" or "point-the-bit". Push-the-bit systems use pads on the outside of the tool which press against the wellbore thereby causing the bit to press on the opposite side causing a direction change. Point-the-bit systems cause the bit direction to change relative to the rest of the tool by bending the main shaft running through it.

The antennae of the transmitter subassembly 210 and the receiver subassemblies 208, 209 are tilted and spaced relative to one another along the axial direction of the bottomhole assembly, as evident from FIGS. 2A and 2B. The tilted antennae each have a magnetic dipole moment that is not aligned with the tool axis (e.g., the central axis of the BHA 105) nor orthogonal to the tool axis. The transmitter subassembly 210 and receiver subassemblies 208 and 209 may contain a set of orthogonal magnetic dipole antennas, with axial and transverse coils that can also be combined with tiled antennae. The tool configuration may have multiple transmitter assemblies 210, and more than two receiver subassemblies. Although the antennae have been described in terms of magnetic dipole antennas, the antennae also may comprise electric dipole antennas. By way of example, magnetic dipole antennas may use coils, while electric dipole antennas may use electrodes and/or toroids.

Figure 2C:
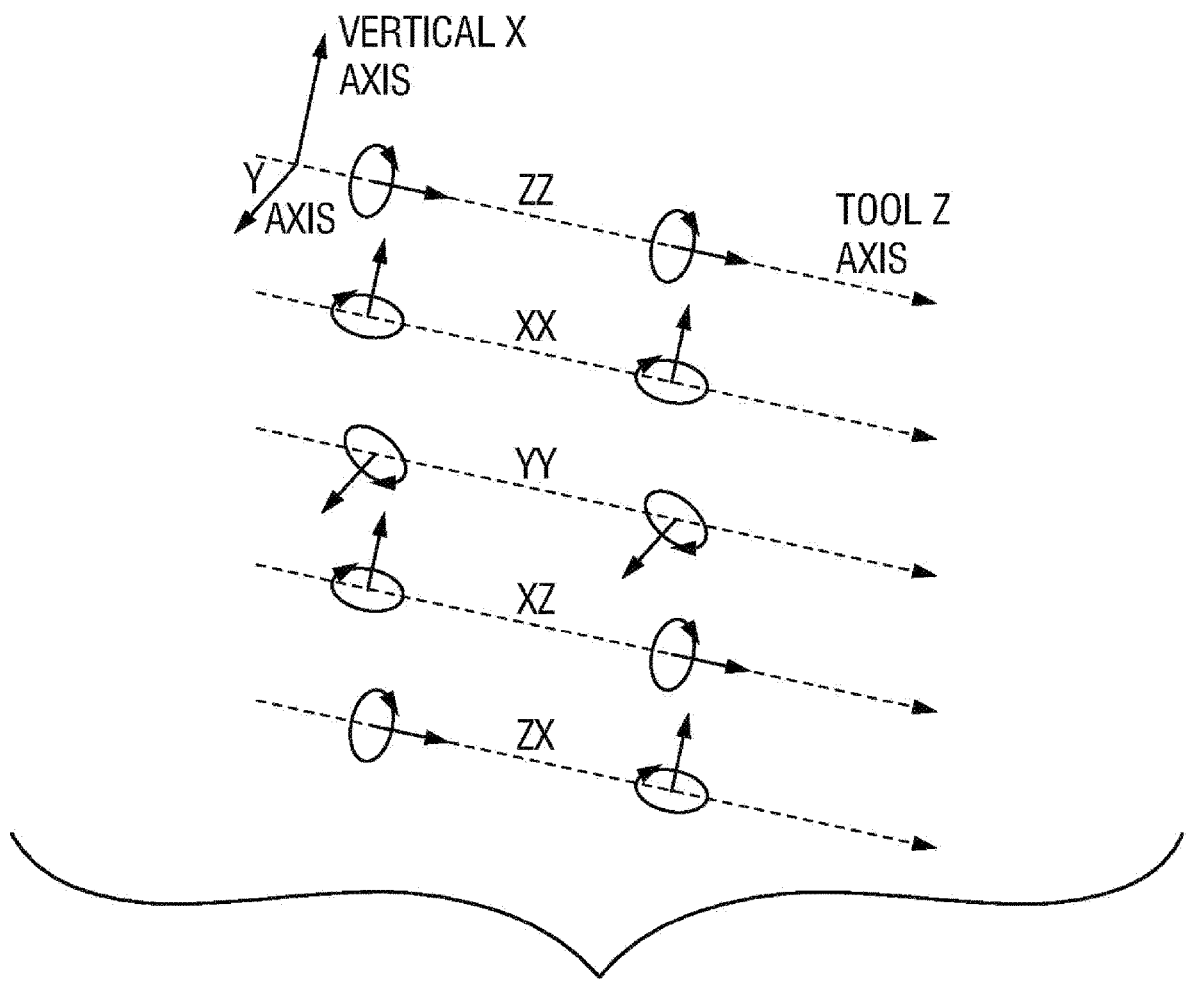
FIG. 2C is a schematic illustration of an electromagnetic mutual impedance tensor that can be derived from measurements of the LWD tool of FIG. 2B, including the relation of the components of the tensor to antennae orientations.

In embodiment(s), the antennae of the transmitter subassembly 210 and the receiver subassemblies 208, 209 can be configurable with up to three spacings (with two shown on FIG. 2A). The tilted antennae spaced along the tool can provide phase and amplitude voltage measurements at a broad range of sub-100 kHz frequencies. For each transmitter/receiver spacing and frequency, the phase and amplitude response measurement is a linear combination of elementary electromagnetic couplings, allowing determination of nine components of a 3D mutual impedance tensor between transmitter and receiver during tool rotation as shown in FIGS. 2B and 2C. In this example, the Z axis is aligned with the tool axis, the X and Y axes are perpendicular to each other and to the Z axis. The first letter of the tensor component corresponds to the dipole moment direction of the receiver, and the second letter corresponds to the dipole moment direction of the transmitter. In this configuration, measurements can be made of the voltage amplitude and phase at a receiver antenna as induced by a signal transmitted from the transmitter antenna. Such receiver amplitude and phase measurements are proportional to the magnitudes and depend on directions of the transmitter and receiver dipole moments via the 3D mutual impedance tensor. The 3D mutual impedance tensor couplings depend on the frequency of the transmitted signal, the transmitter/receiver spacing, and formation parameters (including anisotropic resistivity of the formation and formation geometry, i.e. position of boundaries, contacts, faults and other heterogeneities). Exemplary methods for determining the components of the 3D mutual impedance tensor from the voltage measurements of the LWD modules of the BHA 105 are described in detail in U.S. Pat. No. 8,736,270, commonly assigned to assignee of the present disclosure and herein incorporated by reference in its entirety.

Figure 2D:
FIG. 2D is a chart that summarizes a variety of directional measurements that are generated by combining various impedance tensor components of FIG. 2C as determined from the transmitter/receiver voltages measurements during tool rotation.

Furthermore, individual components of the 3D mutual impedance tensor may be used, or various combinations of the 3D mutual impedance tensor components can be combined, to obtain a set of directional measurements that is used to infer formation properties and structure. FIG. 2D summarizes a variety of directional measurements that can be generated by combining various tensor components as determined from the transmitter/receiver measurements during tool rotation, and corresponding spatial sensitivities in XY plane. The harmonic resistivity measurements (UHR) are sensitive to formation resistivity and resistivity anisotropy and have no azimuthal sensitivity with respect to the tool axis. The symmetrized directional measurements (USD) are sensitive to boundaries and conductivity contrast. The measurements are created using elementary couplings insensitive to the tool azimuth and coupling with $\cos \theta$ sensitivity with respect to tool rotation azimuth $\theta$, therefore these measurements are also referred as the first harmonic measurement. In XY plane, the spatial sensitivity of the measurements has two symmetric lobes of different polarity, either positive or negative depending on the presence of conductivity above or below the tool (in the X direction). The anti-symmetrized directional measurements (UAD) are sensitive to relative dip and resistivity anisotropy of the formation and are largely insensitive to boundaries unless there is a boundary between transmitter and receiver subassemblies. This class of measurements is composed using the same components as USD measurements, also including couplings that have $\cos \theta$ azimuthal sensitivity with respect to tool axis. The harmonic anisotropy measurements (UHA) are sensitive to resistivity anisotropy in non-vertical wells and boundaries of the formation in HA/HZ wells. These measurements are created using transverse couplings with $\cos 2\theta$ azimuthal sensitivity with respect to tool axis for tool rotation azimuth $\theta$, and are also called the second harmonic measurements, with sensitivity in XY plane having four polarized lobes distributed about the tool axis. The 3D indicator measurements (U3DF) is sensitive to lateral heterogeneities in the formation (such as a faults) that are offset from the tool in the Y direction.

Figure 2E:
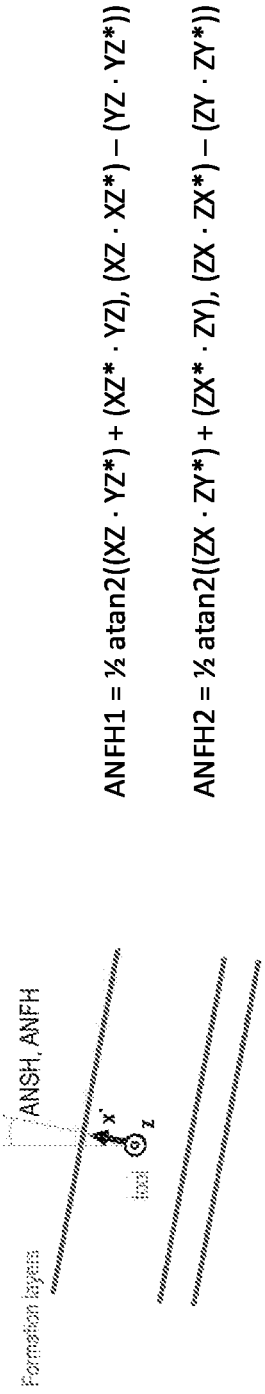
FIG. 2E is an illustration of a set of mathematical equations that use various impedance tensor components of FIG. 2C to determine the apparent bedding azimuth angle with respect to the LWD tool (and corresponding bottom hole assembly) during drilling.

Note that the components of the 3D mutual impedance tensor can also be used to determine the azimuthal orientation of the layering of the formation relative to the tool reference "up" orientation, as shown in FIG. 2E. This angle (referred to as the Apparent Azimuth) refers to the azimuthal offset of the normal axis X' of the layering of formation with respect to the reference tool orientation defined by axis X and can be determined from a first harmonic angle ANFH computed from the components of the 3D mutual impedance tensor as shown and a second harmonic angle ANSH computed from the components of the 3D mutual inductance tensor as shown. In these calculations, atan 2 is the arctangent function with two arguments as is well known. Furthermore, the * notation represents the complex conjugate of the respective tensor component.

Figure 3:
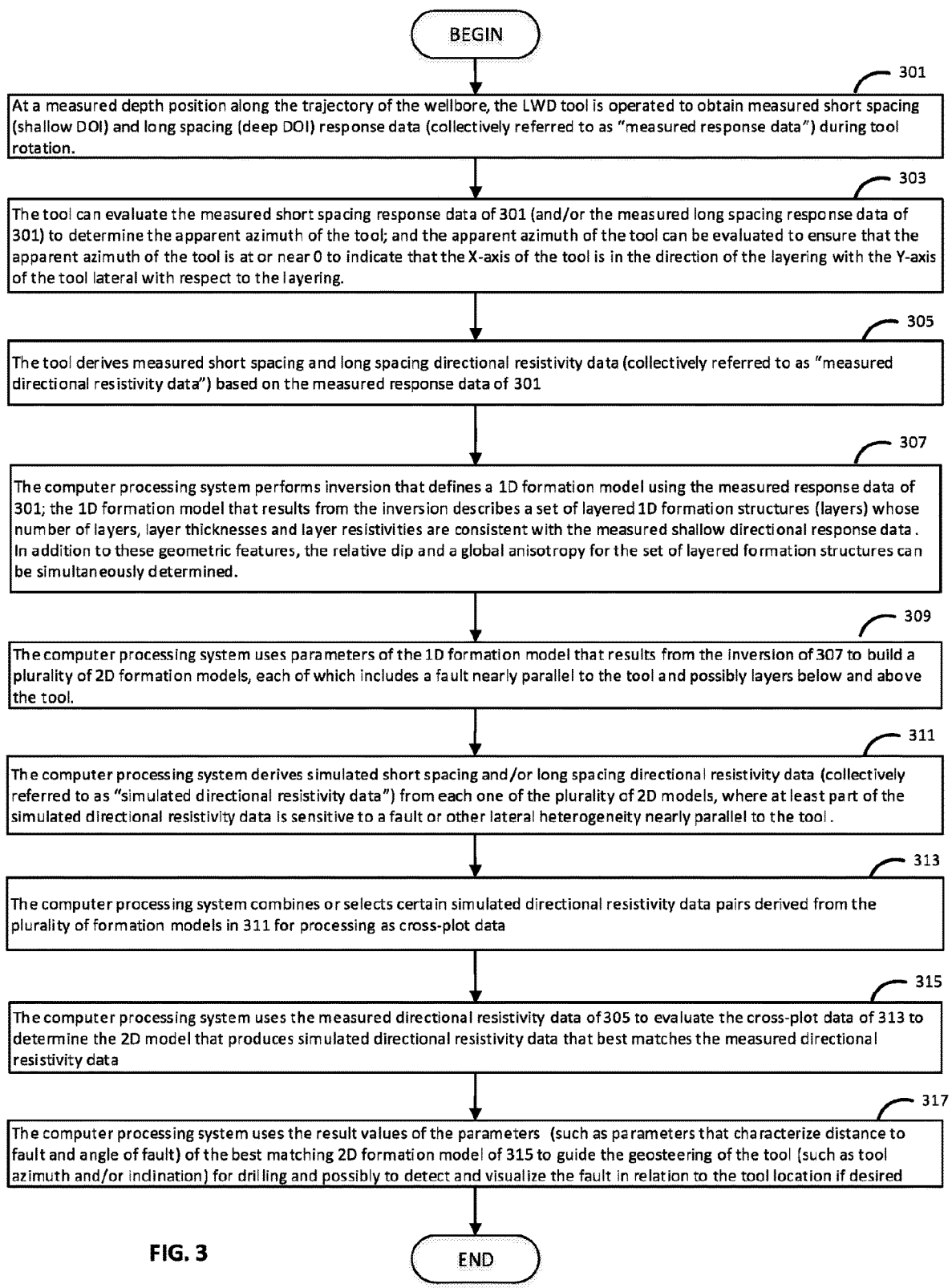
FIG. 3 is a flow chart illustrating a workflow that uses the directional measurements of the LWD tool of the system to detect and model faults or other heterogeneities that are offset laterally with respect to the tool during drilling operations. The workflow can also provide for visualization of faults or other heterogeneities that are offset laterally with respect to the LWD tool during drilling operations and for geo-steering of the drill bit based on characteristics of such faults or other heterogeneities.

In order to take advantage of the deep depth of investigation of these directional measurements, which can span multiple boundaries and support real-time well placement decisions, an improved workflow shown in FIG. 3 has been developed that may be used to accurately model, detect and determine positions of faults or other heterogeneities that are offset laterally with respect to the tool during drilling operations. The workflow uses the directional resistivity measurements of the tool to detect and determine position of faults or other heterogeneities that are offset laterally with respect to the tool during drilling operations. In some embodiments, the workflow can also provide for visualization of faults or other heterogeneities that are offset laterally with respect to the tool during drilling operations and for geo-steering of the drill bit based on characteristics of such faults or other heterogeneities. The workflow can be carried out in real-time while drilling by the BHA 105 in conjunction with processing by the surface-located high performance computing center 203.

The workflow begins in block 301 where, at a measured depth position along the trajectory of the wellbore that is planned or modified during the drilling operations, the LWD tool (such as the LWD tool of FIGS. 1A and 1B) is operated to obtain short spacing (shallow DOI) and long spacing (deep DOI) transmitter/receiver voltage phase and amplitude measurements during tool rotation, used to processes the measured short spacing and long spacing response data obtained by the tool (referred to herein as "measured short spacing response data" or "measured long spacing response data" or collectively as "measured response data").

In block 303, the tool can evaluate the measured short spacing response data of block 301 (and/or the measured long spacing response data of block 301) to determine the apparent azimuth of the tool. In one embodiment, various components of the 3D mutual inductance tensor as determined from the short spacing and long spacing transmitter/receiver voltage measurements of block 301 can be processed to determine the apparent azimuth of tool (which is related to the bedding direction of the layering of the formation) as set forth in FIG. 2E. Furthermore, the apparent azimuth of the tool can be evaluated to ensure that it is at or near zero to indicate that the X-axis of the tool is primarily in the direction of the formation layering with the Y-axis of the tool lateral with respect to the formation layering.

In block 305, the tool derives measured short spacing and long spacing directional resistivity data based on the measured short spacing and long spacing response data of block 301. In one embodiment, the measured short spacing and long spacing directional resistivity data can be generated by combining various components of the 3D mutual inductance tensor as determined from the short spacing and long spacing transmitter/receiver voltage phase and amplitude measurements of block 301 as summarized in FIG. 2D.

In block 307, the computer processing system 203 performs an inversion operation to define a 1D model of the formation using the measured response data obtained in block 301. The 1D formation model that results from the inversion describes a set of layered 1D formation structures (layers) whose number of layers, layer thicknesses and layer resistivities are consistent with the measured shallow and deep directional response data. In addition to these geometric features, the relative dip and a resistivity anisotropy, global or for individual layers, for the set of layered formation structures can be simultaneously determined.

In one embodiment, the inversion operation of block 307 can utilize certain short spacing response data obtained in block 301 that is sensitive to formation resistivity in the azimuthal (X') direction of the tool to define the 1D model of the formation near the tool. This 1D formation model can be augmented with layers based on inversion using measured long spacing response data acquired in the same well or from data obtained in nearby wells. In another embodiment, the inversion operation of block 307 can utilize measured short spacing and long spacing response data and possibly data obtained from nearby wells to define the 1D model of the formation.

The selection of the appropriate inversion operation of block 307 can be based on analysis of certain measured short spacing and long spacing directional resistivity data of block 305 (e.g., measured UD3F directional response) that is sensitive to faults or other heterogeneities offset laterally (in the Y direction) from the tool. For example, if the measured UD3F directional response is high for long spacing and low for short spacing, a fault or other heterogeneity is far from the current tool location. In this case, the inversion operation of block 307 can utilize measured short spacing response data that is sensitive to formation resistivity in the azimuthal (X') direction of the tool to define the 1D model of the formation near the tool. This 1D formation model can be augmented with layers based on inversion using measured long spacing response data from the same well when the fault is far from the current tool location or from data obtained in nearby wells. However, if the measured UD3F directional response is high for both long spacing and short spacing, the construction of the layered formation model operation of block 307 can utilize a model from the same well, constructed when the fault was away using measured short spacing and long spacing response data and possibly data obtained from nearby wells to define the 1D model of the formation.

Figure 4:
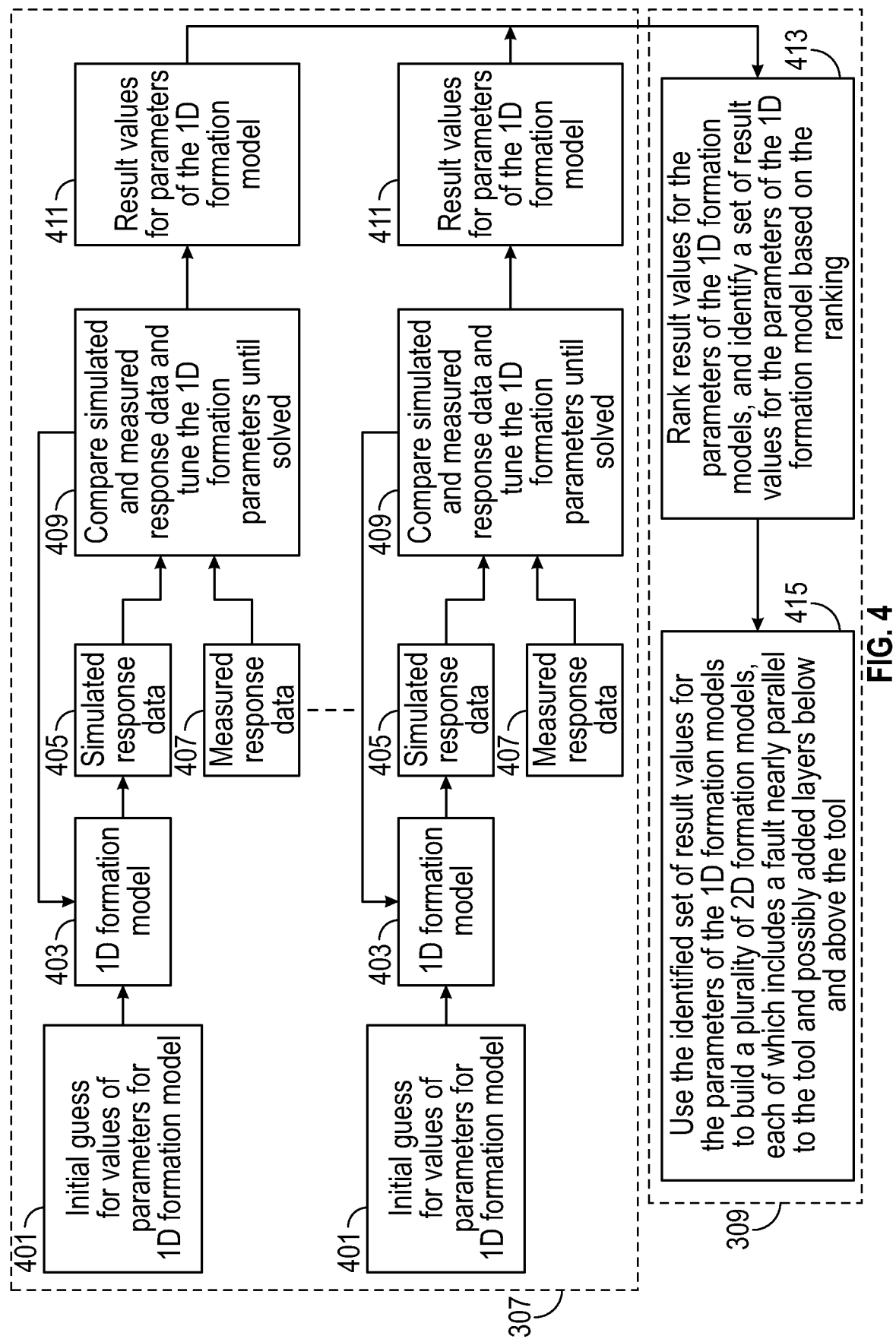
FIG. 4 is a flow chart illustrating exemplary parallel one-dimensional (1D) formation model inversion operations and associated processing that can be carried out as part of the workflow of FIG. 3.

In embodiments, the inversion operation of block 307 can involve parallel inversion of a plurality of 1D formation models to simulate the response of the tool as shown in FIG. 4. The initial guesses for the 1D formation models are varied over the parallel inversions (blocks 401, 403, 405, 407, 409, and 411). In each inversion, the parameters of the respective 1D formation model can be adjusted until the simulated response data of the tool match the measured response data of the tool. The respective 1D formation models can be constrained by prior knowledge of the formation and possibly the results of prior inversion operations for other measurement station(s). The inversion algorithm can be based on a Gauss-Newton optimization scheme with a regularization term and a weighting based on the data. Examples of such inversion operations are described in Habashy et al., "A general framework for constraint minimization for the inversion of electro-magnetic measurements," Progress in Electromagnetics Research, Vol. 46, 2004, pp. 265-312, herein incorporated by reference in its entirety. Other 1D electromagnetic forward modeling and inversion approaches can also be used if desired.

In block 309, the computer processing system 203 utilizes the parameters of the 1D formation model that results from the 1D inversion of block 307 to build a plurality of 2D formation models, each of which includes a fault or other heterogeneity 115 nearly parallel to the tool and possibly added layers below and above the tool. In embodiments, block 309 can involve ranking result values for the parameters of the 1D formation models, and identifying a set of result values for the parameters of the 1D formation model based on the ranking (block 413). In embodiments, block 309 can also involve using the identified set of result values for the parameters of the 1D formation models to build a plurality of 2D formation models each of which includes a fault nearly parallel to the tool and possible added layers below and above the tool (block 415).

Figure 5:
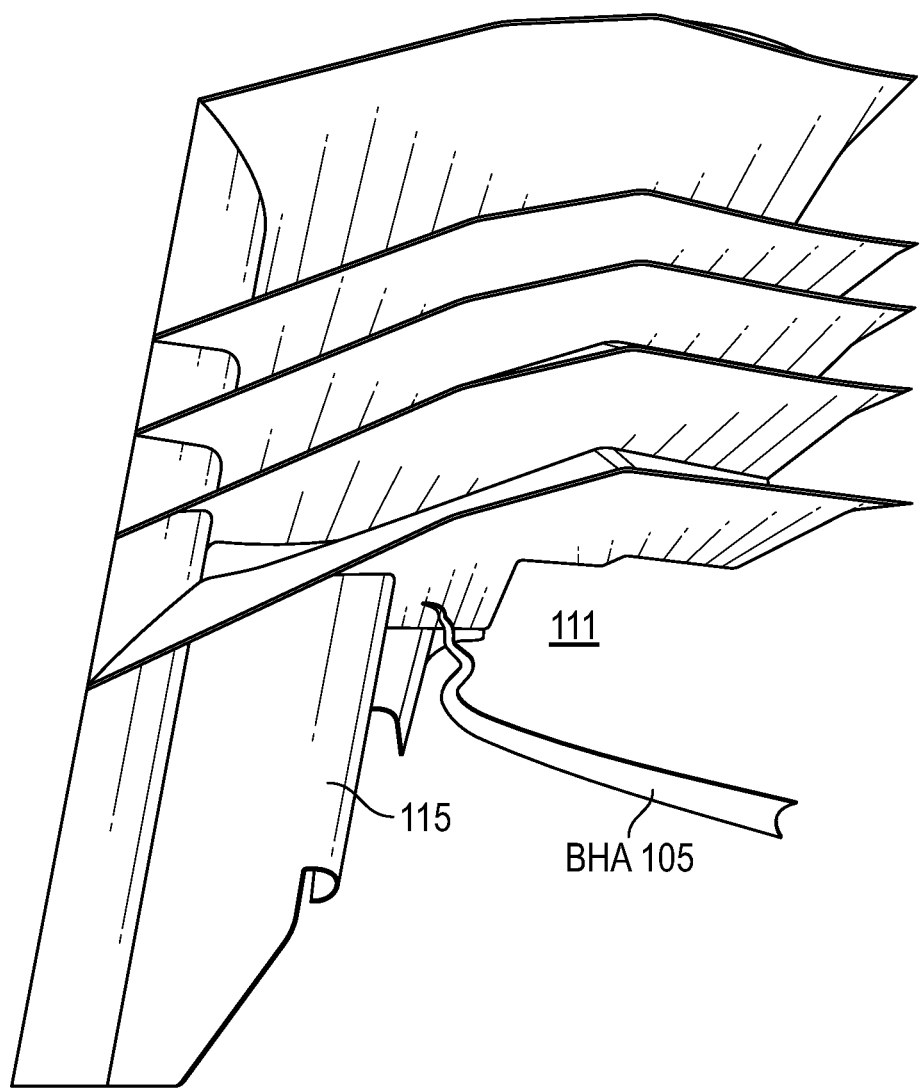
FIG. 5 is a schematic illustration of an application of the system of FIG. 1 with respect to the detection and modeling of a lateral fault as well as possibly geo-steering of the drill bit of the system based on position of the lateral fault as provided by the modelling.
Figure 6:
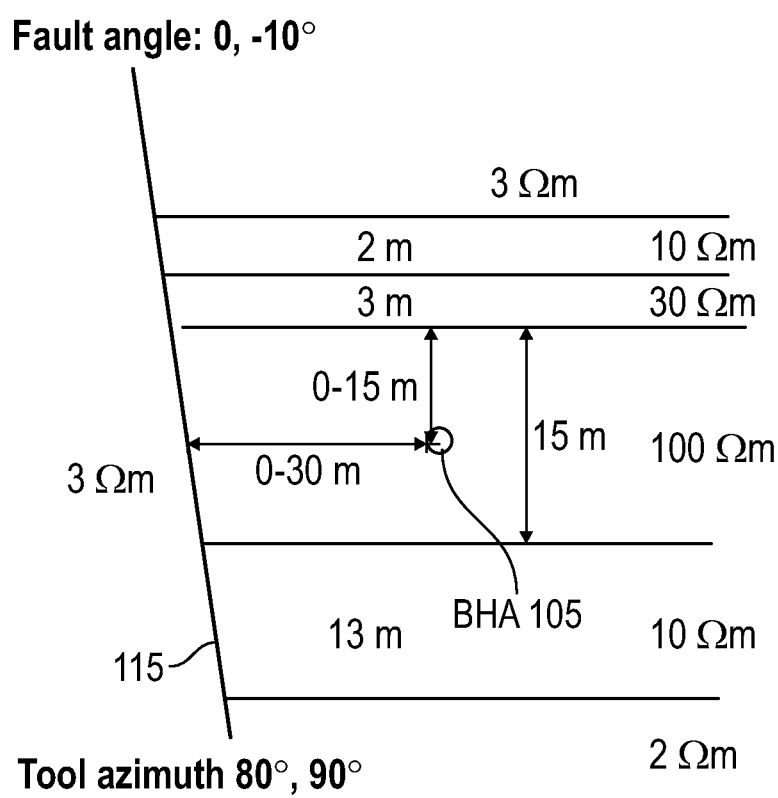
FIG. 6 is a schematic illustration of a 2D formation model, including tool position located within a 1D layered formation structure and a fault offset laterally relative to the tool position.

An example of such a reservoir with a fault is shown in FIG. 5, and an example of one of these 2D formation models is shown in FIG. 6 which includes a layer stack of six layers. The tool is located within an intermediate layer that has a thickness of 15 m and resistivity of 100 Ωm. There is a series of three layers above the intermediate layer of the tool, including a top layer having a resistivity of 3 Ωm and thickness beyond the maximum depth of investigation of the tool, a second layer below the top layer having a thickness of 2 m and a resistivity of 10 Ωm, and a third layer between the second layer and the intermediate layer having a thickness of 3 m and a resistivity of 30 Ωm. There is also a series of two layers below the intermediate layer of the tool, including a bottom layer having a resistivity of 2 Ωm and thickness beyond the maximum depth of investigation of the tool and a second layer between the bottom layer and the intermediate layer having a thickness of 13 m and a resistivity of 30 Ωm. The tool is located in the intermediate layer at predefined distance (in the X direction) from the layer thereabove, which for example can be set from 0 to 15 m. The wellbore trajectory also has an azimuth angle relative to horizontal, which for example can be set in the range from 80° to 90°. The tool is offset laterally (in the Y direction) from the fault or other heterogeneity 115 that extends in a plane substantially perpendicular to the layering at a predefined angle, which for example can be set in the range from 0° to −10°. The formation beyond the fault or other heterogeneity 115 is assumed to be homogenous with a resistivity of 3 Ωm. Other 2D formation models can include additional layers (or less layers) above and/or below the tool with different thicknesses and/or resistivities, and the model of the resistivity of the formation beyond the fault can be more complex and include resistivity anisotropy. Furthermore, the location of tool in the intermediate layer and relative to the fault, its azimuth angle, and the fault angle can be varied.

In one embodiment, the 1D formation model parameters used to build the plurality of 2D formation models in block 309 can be determined by ranking the result values for parallel inversions of block 307 as shown in FIG. 4.

In block 311, the computer processing system 203 uses the plurality of 2D formation models of block 309 to simulate short spacing and/or long spacing directional resistivity data (collectively "simulated directional resistivity data") from each one of the plurality of 2D models, where at least part of the simulated directional resistivity data is sensitive to the fault or other lateral heterogeneity nearly parallel to the tool in the plurality of 2D models. The simulation operation can utilize finite difference or finite element forward modeling approaches where Maxwell's differential equations with respect to the EM field (or its potentials) are discretized on a 2D finite difference grid or finite element mesh. This leads to the resulting system of linear equations with respect to the approximate EM field/potentials, which is solved iteratively or using a direct solver. The solution to the system of equations can be used to simulate the tool response (e.g., receiver voltages of the tool). Other simulation methods that use integral equations, finite volume, BEM or other techniques can also be used. Such tool response data can be processed to solve for the components of the 3D mutual impedance tensor, and these tensor components can be combined to derive the simulated directional resistivity data of the tool.

In block 313, the computer processing system 203 combines or selects certain simulated directional resistivity data pairs derived from the plurality of 2D formation models in 311 for processing as two-dimensional cross-plot data. The two-dimensional cross-plot data depicts particular pairs of the simulated directional resistivity data for different 2D formation models where the distance between the tool location and the fault/heterogeneity as well as the offset of the tool location to the layer or boundary above or below the tool are varied over certain predefined ranges. The two-dimensional cross-plot data can be used to evaluate distance to the fault and one additional model parameter, typically distance to a reference boundary in the layered formation.

In block 315, the computer processing system 203 uses the measured directional resistivity data of block 305 to evaluate the two-dimensional cross-plot data of block 313 in order to determine the 2D formation model that produces simulated directional resistivity data that best matches the measured directional resistivity data of block 305. In embodiment(s), the multi-dimensional cross-plot data of different simulated directional resistivity data pairs as derived from the same formation model can be evaluated for consistency in matching the measured directional resistivity data of the tool in order to identify the formation model that best matches the measured directional resistivity data obtained by the tool.

In one embodiment, the evaluation of the two-dimensional cross-plot data in block 315 can be a manual or semi-automatic process that displays a visual representation of the two-dimensional cross-plot data as one or more two-dimensional cross-plots (FIG. 8) for interpretation by a human operator. The human operator can evaluate each given cross-plot using the measured directional resistivity data of block 305 that corresponds to the simulated directional resistivity data pair of given cross-plot to identify the 2-D formation model that produces a simulated directional resistivity data pair that best matches the corresponding measured directional resistivity data. This operation can be performed for multiple two-dimensional cross-plots derived from various 2D formation models, using different pairs of directional measurements, such as phase shifts and attenuations, or measurements acquired at different frequencies in order to ascertain if the same 2D formation model is consistently the best matching 2D formation model. This allows the human operator to evaluate 2D formation model validity where the valid 2D formation model (and estimated distance to fault and/or distance to reference boundary that is represented by the valid 2D formation model) are adopted for interpretation and can be used for subsequent analysis (such as tool geo-steering decisions and fault detection and visualization as described below in block 317).

Figure 8:
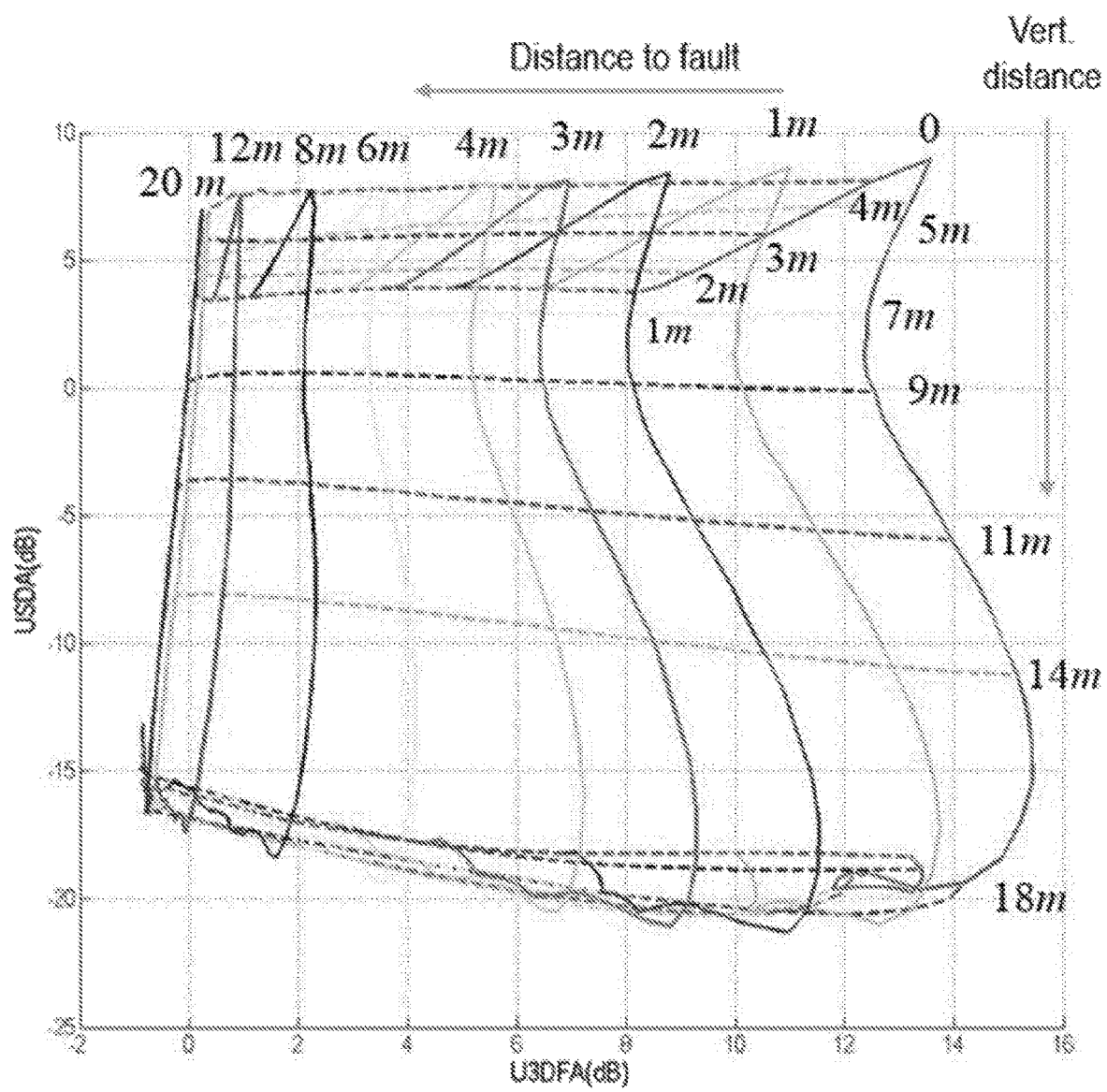
FIG. 8 shows a cross-plot of simulated directional response data for certain channels of the GeoSphere LWD tool as derived from different two-dimensional (2D) models that have varied tool positions in the formation.

For example, consider the cross-plot of FIG. 8 constructed from simulated directional attenuations U3DFA and USDA for a number of different 2D formation models. If the measured U3DFA reads 6 dB and the measured USDA reads −5 dB, the best matching 2D formation model is given as the 2D formation model having an estimated approximate distance to fault as 4 m and a vertical distance to boundary of 11.2 m. Multiple cross-plots, such as a U3DFP-USDP cross-plot at the same frequency or a U3DFA-USDA cross-plots at different frequencies, can be used to evaluate the best matching 2D formation model. If the same 2D formation model is consistently the best matching 2D formation model with respect to the different measured directional measurement pairs, that 2D formation model can be assumed to be an adequate representation of the reservoir, and the distance between the fault and the tool position provided by that 2D formation model can be used for subsequent analysis (such as tool geo-steering decisions and fault detection and visualization as described below in block 317).

In another embodiment, the evaluation of the two-dimensional cross-plot data in block 315 can be an automatic process (without human operator input). In this case, the computer processing system 203 can process the two-dimensional cross-plot data for a simulated directional resistivity data pair using the measured directional resistivity data of block 305 that corresponds to the simulated directional resistivity data pair to determine the 2-D formation model that produces a simulated directional resistivity data pair that best matches the corresponding measured directional resistivity data. This operation can be performed for the two-dimensional cross-plot data for multiple simulated directional resistivity measurement pairs as derived from various 2D models, using different pairs of directional measurements, such as phase shifts and attenuations, or measurements acquired at different frequencies in order to ascertain if the same 2D formation model is consistently the best matching 2D formation model. This allows the computer processing system 203 to evaluate 2D formation model validity where the valid 2D formation model (and estimated distance to fault and/or distance to reference boundary that is represented by the valid 2D formation model) are adopted for interpretation and can be used for subsequent analysis (such as tool geo-steering decisions and fault detection and visualization as described below in block 317).

In block 317, the computer processing system 203 uses the result values of the parameters of the best matching 2D formation model (such as parameters that characterize distance to fault and distance to a reference boundary) as determined in block 315 to guide the geo-steering decision of the BHA (by changing the tool azimuth and/or inclination) and possibly to detect and visualize the fault in relation to the tool location if desired. In geo-steering, the drilling direction of the tool as dictated by the tool azimuth and/or inclination can be dynamically controlled by the geo-steering control module 204 based on the result values (i.e., the distance of the fault or other heterogeneity relative to position of the tool and angle of fault) of the parameters of the best matching 2D formation model. In visualizing the fault in relation to the tool location, the computer processing system 203 can be configured to (i) generate a representation of the position of the fault relative to the tool or other heterogeneity based on the result values (e.g., the distance of the fault or other heterogeneity relative to position of the tool and angle of fault) of the parameters of the best matching 2D formation model, (ii) store such representation in computer memory, and (iii) output such representation for display on one or more display devices.

Note that the workflow of blocks 301 to 317 can be repeated at other measured depth positions along the trajectory of the wellbore that is planned or modified during the drilling operations. In this manner, the workflow uses the directional measurements of the tool to detect and model faults or other heterogeneities that are offset laterally with respect to the tool during drilling operations. The workflow can also provide for detection and visualization of faults or other heterogeneities that are offset laterally with respect to the tool during drilling operations and for geo-steering of the drill bit based on characteristics of such faults or other heterogeneities.

In one embodiment, the cross-plot data of block 313 of the workflow can depict a simulated symmetrized directional measurement (such as symmetrized directional attenuation or USDA, and/or symmetrized directional phase shift or USDP) and a simulated 3D indicator measurement (such as 3D indicator attenuation or U3DFA, and/or 3D indicator phase shift or U3DFP) for different 2D models where the distance between the tool location and the fault/heterogeneity as well as the offset of the tool location to the layer above the tool are varied over certain predefined ranges.

Figure 7A:
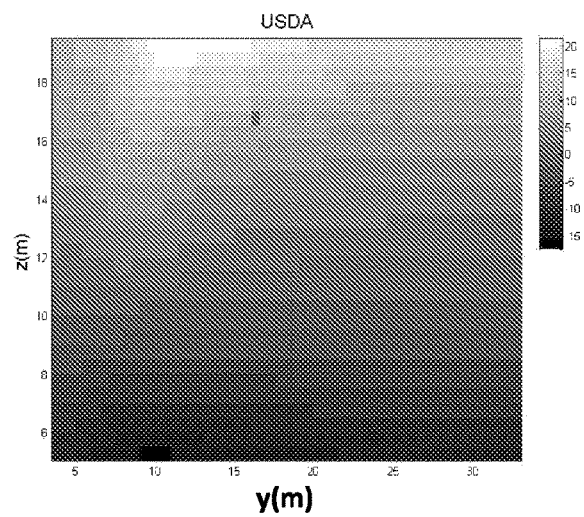
FIGS. 7A, 7B, 7C and 7D are plots that show the spatial sensitivities of exemplary directional response data obtained from the GeoSphere LWD tool and service commercially provided by Schlumberger Technology Corporation.
Figure 7B:
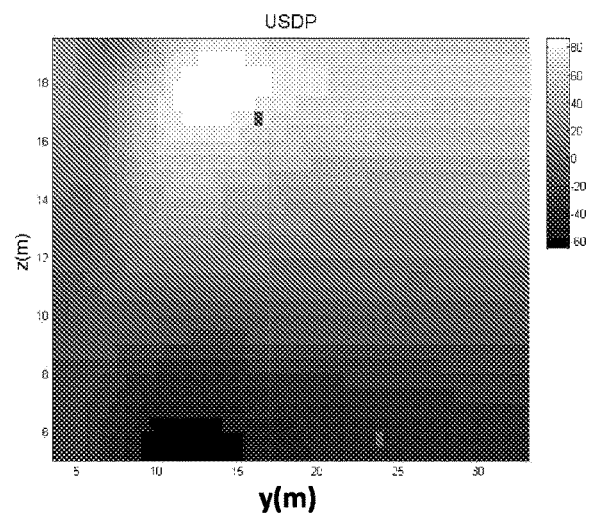
Figure 7C:
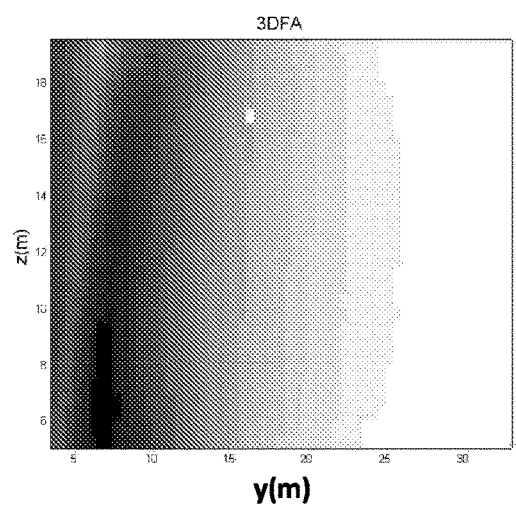
Figure 7D:
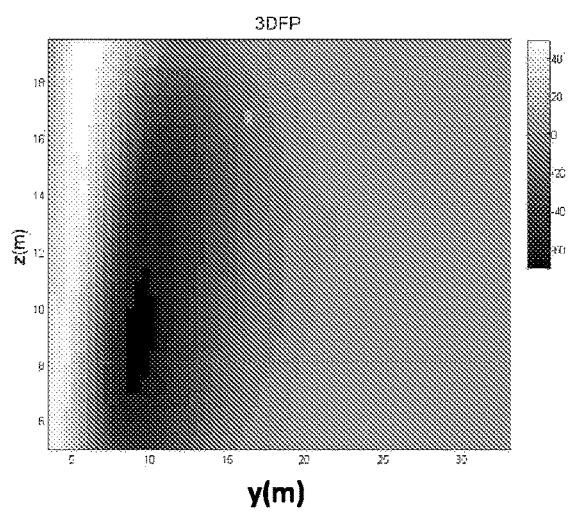

FIGS. 7A, 7B, 7B and 7D are plots that show the spatial sensitivities of exemplary directional response data obtained from the GeoSphere LWD tool and service commercially provided by Schlumberger Technology Corporation. The GeoSphere LWD tool and associated methodologies are described in Seydoux et al., "Full 3D Deep Directional Resistivity Measurements Optimize Well Placement and Provide Reservoir-Scale Imaging While Drilling," SPWLA 55th Annual Logging Symposium (May 2014), which is incorporated herein by reference in its entirety. FIGS. 7A and 7B shown the standard symmetrized directional attenuation and phase shift channels, USDA and USDP, that are measurements providing "up-down" sensitivity. These are the standard channels of the GeoSphere tool. These measurements represent the ratio combination of elementary couplings (elements of mutual impedance tensor) $(ZZ+XZ)*(ZZ+ZX)/((ZZ-XZ)*(ZZ-ZX))$, where X axis is in the direction of layering, and Z is the tool axis orientation. As the tool moves away from the fault the response is changing less. FIGS. 7C and 7D show the 3D formation indicator channels U3DFA and U3DFP obtained from the GeoSphere tool. These measurements represent $(ZZ+YZ)*(ZZ+ZY)/((ZZ-YZ)*(ZZ-ZY))$ couplings, where Y-direction is lateral with respect to formation layering. These measurements are indicators of a lateral fault or other heterogeneity. It should be noted that this behavior is for measurements derived from standard mapping-while-drilling processing, using the second harmonic angle (ANSH) to compose the first harmonic directional responses.

Given the above-described sensitivities, cross-plot data can be constructed based on simulated USD and U3DF channels for different 2D models where the distance between the tool location and the fault/heterogeneity as well as the offset of the tool location to the layer above the tool are varied over certain predefined ranges. The USD and U3DF channels are chosen for the cross-plot data because they have nearly orthogonal sensitivities to layering (up-down) and fault or any other lateral heterogeneity with resistivity contrast. FIG. 8 shows exemplary cross-plot data of the simulated U3DFA and USDA channels based on different 2D models of the kind shown in FIG. 6.

Note that the simulation of the USD and U3DF channels can be a function of resistivity distribution, contrasts, tool spacings (transmitter-receiver separations) and excitation frequencies. Typically, the GeoSphere tool uses two receivers, allowing monitoring the formation variation at different scales.

Figure 9:
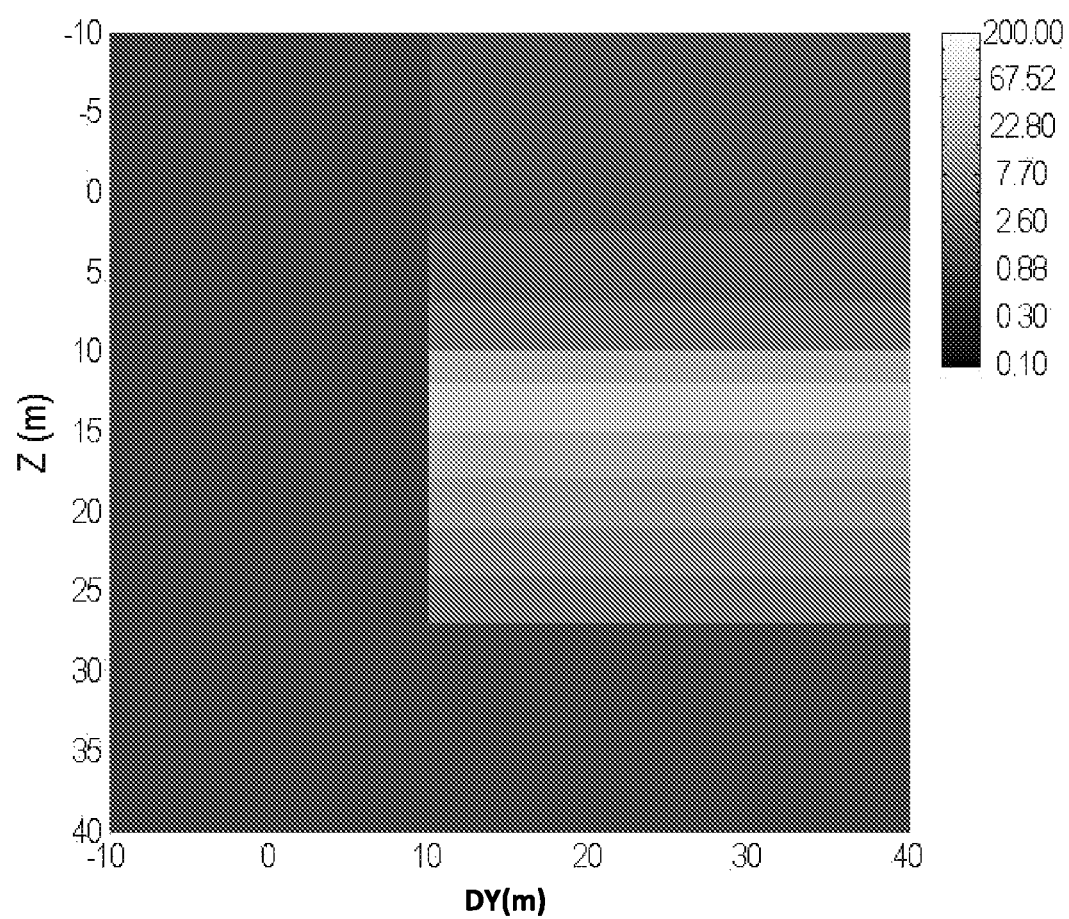
FIG. 9 shows an exemplary 2D formation model with a fault.
Figure 10A:
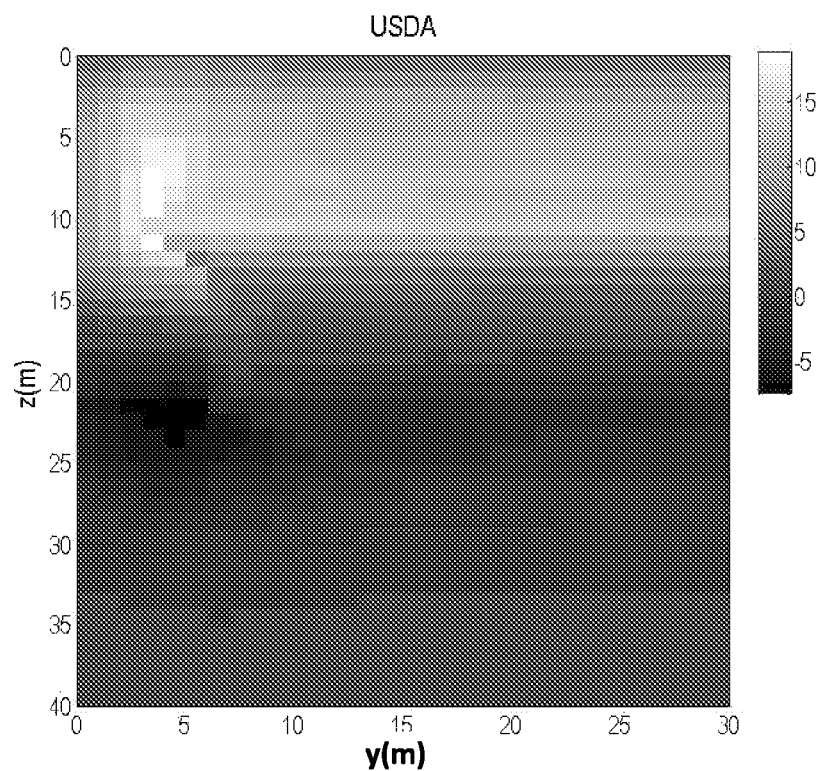
FIGS. 10A and 10B are plots of simulated directional response data (USDA and U3DFA) generated from the 2D formation model of FIG. 9 for common tool spacings of 17 m of the GeoSphere LWD tool at certain frequency F4 for short spacing (shallow DOI).
Figure 10B:
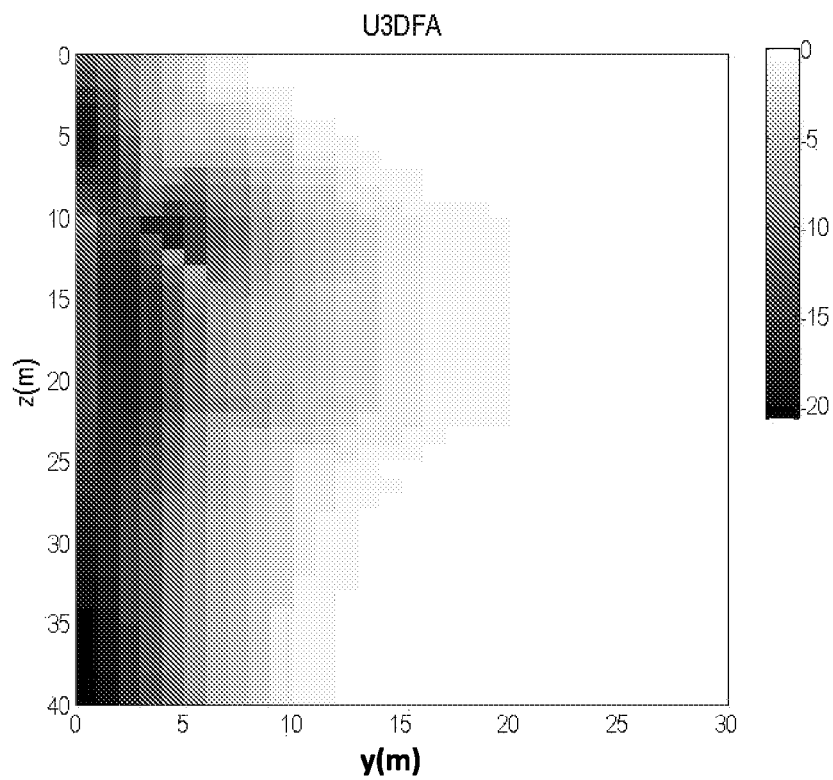
Figure 11A:
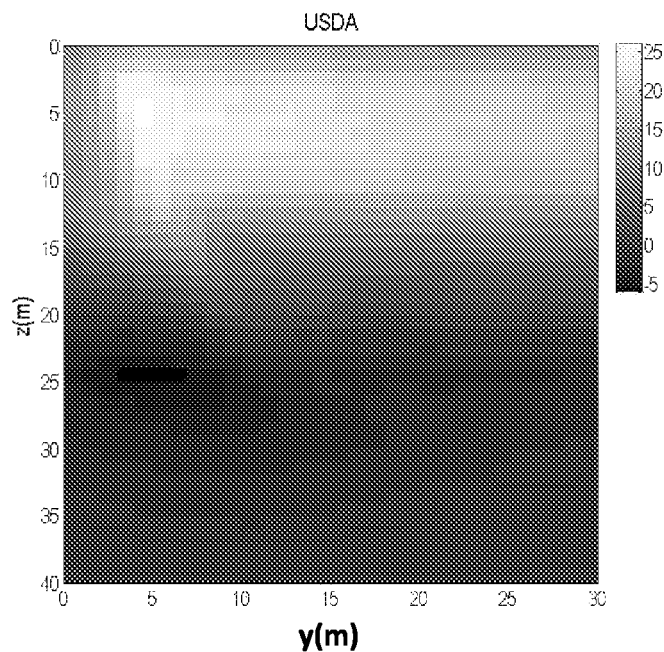
FIGS. 11A and 11B are plots of simulated directional response data (USDA and U3DFA) generated from the 2D formation model of FIG. 9 for common tool spacings of 27 m a of the GeoSphere LWD tool at certain frequency F2 for long spacing (deep DOI).
Figure 11B:
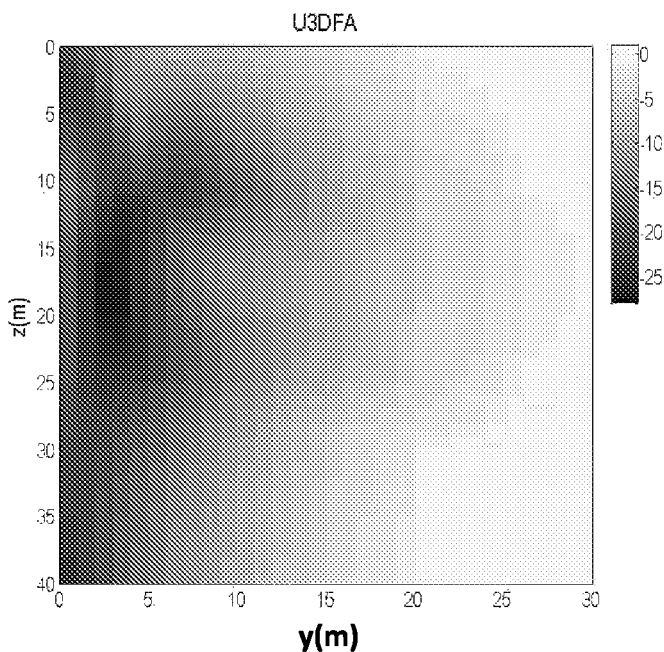
Figure 12:
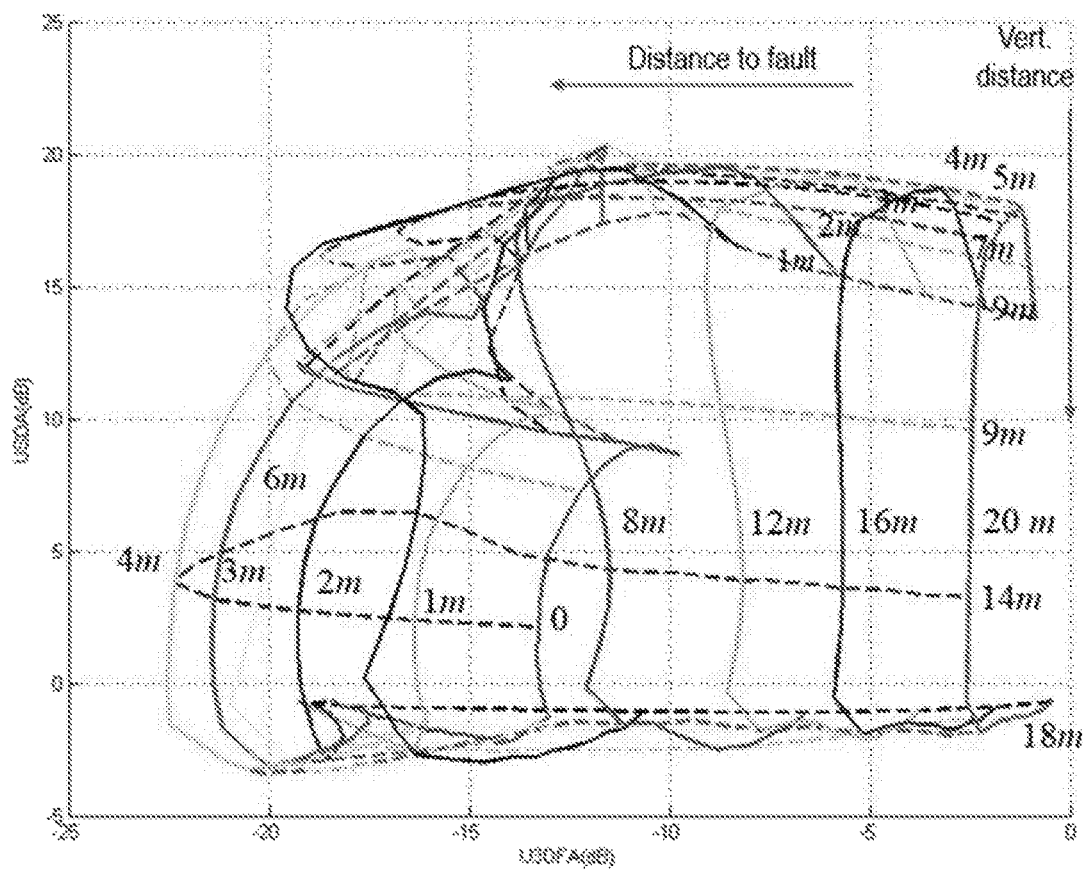
FIG. 12 shows the cross-plot of the simulated USDA and U3DFA channel for the short spacing measurements (shallow DOI) of the GeoSphere LWD tool for different 2D formation models of the kind shown in FIG. 9.

FIG. 9 show a 2D model of a formation with a thinner reservoir and a lateral fault. Simulated directional response data was generated from the 2D formation model of FIG. 9 for common tool spacings of 17 m and 27 m at GeoSphere certain frequencies F4 for short spacing (shallow DOI) and F2 for long spacing (deep DOI). The spatial distributions of the simulated USDA and U3DFA for short spacing (shallow DOI) are shown in FIGS. 10A and 10B, and the spatial distributions of the simulated USDA and U3DFA for long spacing (deep DOI) are shown in FIGS. 11A and 11B. FIG. 12 shows the cross-plot data of the simulated USDA and U3DFA channel for the short spacing measurements (shallow DOI) for different 2D formation models of the kind shown in FIG. 9.

In other embodiments, three dimensional cross-plot data or higher dimension cross-plot data can be constructed based on simulated tool response data for different 2D models. In such multi-dimensional cross-plot data, a tuple of N model parameters (where N is an integer of 3 or greater) are varied over certain predefined ranges in constructing the cross-plots. Such multi-dimensional cross-plot data can be evaluated for consistency based on the measured directional tool response data in a manner similar to the cross-plot data evaluation described above in order to determine a formation model that best matches the measured directional tool response data. And that formation model can be assumed to be an adequate representation of the reservoir, and the parameters of that formation model can be used for subsequent analysis (such as fault detection and visualization and/or tool geo-steering decisions or other uses).

In other embodiments, the workflow described herein can be adapted to utilize other formation models and other electromagnetic modeling approaches. For example, formation models and other electromagnetic modeling utilizing two dimensions and/or three dimensions can be used if desired. Specifically, in the case that the azimuth of the fault is significant and the formation is dipping, the workflow can use a three-dimensional model to represent the formation layering and the fault/heterogeneity together with three-dimensional electromagnetic forward modeling to simulate the directional resistivity response data. In this case, the cross-plots can be constructed based on simulated directional response channels for different 3D models where the distance between the tool location and the fault/heterogeneity as well as the offset of the tool location to the layer above the tool are varied over certain predefined ranges. The result values of the parameters of the best matching 3D formation model (such as parameters that characterize distance to fault and angle of fault) as determined from evaluation of the cross-plots can be used to visualize the fault in relation to the tool location and possibly guide the geo-steering of the tool (such as tool azimuth and/or inclination) if desired.

In still other embodiments, the cross-plot(s) can be built based on other simulated directional data responses, such as simulated short-spacing and/or long spacing harmonic resistivity (UHR) measurements of attenuation or phase shift in combination with simulated short-spacing and/or long spacing harmonic anisotropy (UHA) measurements of attenuation or phase shift.

Figure 13:
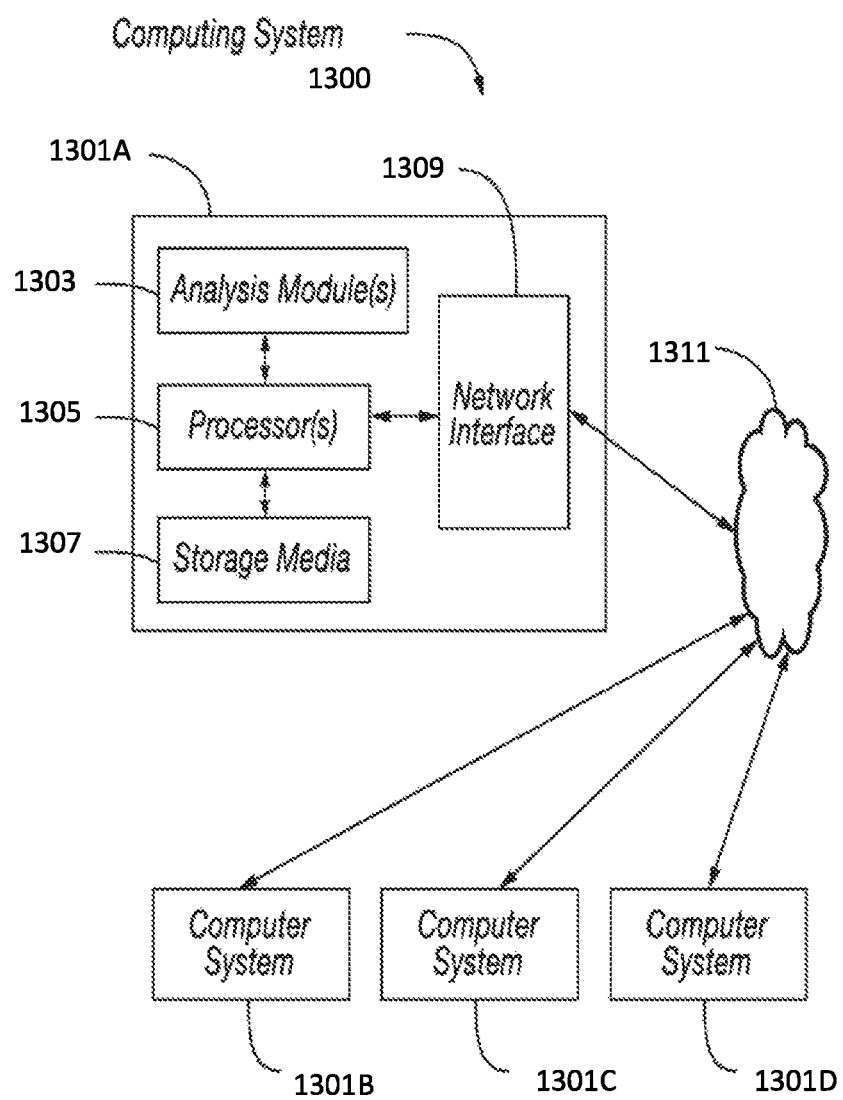
FIG. 13 is a schematic diagram of an example computing system that can be used to implement the high-performance computing center of FIG. 1A.

FIG. 13 shows an example computing system 1300 that can be used to implement the computer processing system 203 of FIG. 1A or parts thereof. The computing system 1300 can be an individual computer system 1301A or an arrangement of distributed computer systems. The computer system 1301A includes one or more analysis modules 1303 (a program of computer-executable instructions and associated data) that can be configured to perform various tasks according to some embodiments, such as the tasks described above. To perform these various tasks, an analysis module 1303 executes on one or more processors 1305, which is (or are) connected to one or more storage media 1307. The processor(s) 1305 is (or are) also connected to a network interface 1309 to allow the computer system 1301A to communicate over a data network 1311 with one or more additional computer systems and/or computing systems, such as 1301B, 1301C, and/or 1301D. Note that computer systems 1301B, 1301C and/or 1301D may or may not share the same architecture as computer system 1301A, and may be located in different physical locations.

The processor 1305 can include at least a microprocessor, microcontroller, processor module or subsystem, programmable integrated circuit, programmable gate array, digital signal processor (DSP), or another control or computing device.

The storage media 1307 can be implemented as one or more non-transitory computer-readable or machine-readable storage media. Note that while in the embodiment of FIG. 13, the storage media 1307 is depicted as within computer system 1301A, in some embodiments, storage media 1307 may be distributed within and/or across multiple internal and/or external enclosures of computing system 301A and/or additional computing systems. Storage media 1307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 1303 can be provided on one computer-readable or machine-readable storage medium of the storage media 1307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 1300 is only one example of a computing system, and that computing system 1300 may have more or fewer components than shown, may combine additional components not depicted in the embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the operations of the computer processing system 203 as described herein may be implemented by running one or more functional modules in an information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

In one embodiment, the operations of the computer processing system 203 as described herein may be implemented by running one or more functional modules in an information processing apparatus (such as a workstation) located at or near the wellsite and/or in an information processing apparatus that is part of the BHA of the downhole tool.

In another embodiment, the operations of the computer processing system 203 as described herein may be implemented by running one or more functional modules in a cloud-based information processing apparatus.

The methods and processes described above such as, for example, modeling, plotting, analyzing, and/or control of any recited hardware, may be performed by a processing system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Thus, the methods and processes described above may be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from embodiments disclosed herein. Accordingly, all such modifications are intended to be included within the scope of this disclosure.

What is claimed is:

1. A method of drilling a wellbore that traverses a geological formation using a drilling tool, the method comprising:
    deriving a plurality of formation models that characterize the geological formation, wherein the plurality of formation models represents layer structures with a heterogeneity offset laterally at variable distances relative to a position of the drilling tool, and wherein the plurality of formation models have variable distance from the drilling tool to the heterogeneity as well as variability in at least one additional model parameter, and deriving multi-dimensional cross-plot data of different models wherein the distance between the tool location and the heterogeneity as well as the offset of the tool location to the layer above the tool are varied over certain predefined ranges;
    deriving simulated directional resistivity data of the drilling tool based on the plurality of formation models;
    combining or selecting simulated directional resistivity data derived from the plurality of formation models for processing as multi-dimensional cross-plot data, wherein the multi-dimensional cross-plot data is derived from particular simulated directional resistivity measurements comprising simulated directional resistivity measurements that are sensitive to resistivity of the geological formation in a lateral direction relative to the drilling tool and simulated directional resistivity measurements that are sensitive to resistivity of the geological formation in the direction of layering;
    using measured directional resistivity data obtained by the drilling tool to evaluate the multi-dimensional cross-plot data and determine a distance of the heterogeneity relative to the position of the drilling tool; and
    controlling a drilling direction of the drilling tool based on the determined distance of the heterogeneity relative to the position of the drilling tool to avoid the heterogeneity that is laterally offset with respect to the position of the drilling tool during the drilling process.

2. A method according to claim 1, wherein:
    certain pairs of the simulated directional resistivity data derived from the plurality of formation models are combined or selected for processing as two-dimensional cross-plot data; and
    the measured directional resistivity data obtained by the drilling tool corresponds to the certain pairs of the simulated directional resistivity data and is used to evaluate the two-dimensional cross-plot data to determine the distance of the heterogeneity relative to the position of the drilling tool.

3. A method according to claim 1, wherein:
    certain N-tuples of the simulated directional resistivity data derived from the plurality of formation models are combined or selected for processing as N-dimensional cross-plot data, where N is an integer greater than three; and the measured directional resistivity data obtained by the drilling tool corresponds to the certain N-tuples of the simulated directional resistivity data and is used to evaluate the N-dimensional cross-plot data to determine the distance of the heterogeneity relative to the position of the drilling tool.

4. A method according to claim 1, further comprising:
generating and storing in computer memory a representation of the position of the drilling tool relative to the heterogeneity based on the determined distance of the heterogeneity relative to the position of the drilling tool.

5. A method according to claim 1, further comprising:
updating a model of the geological formation based on the determined distance of the heterogeneity relative to the position of the drilling tool.

6. A method according to claim 1, wherein:
the heterogeneity comprises a fault.

7. A method according to claim 1, wherein:
the plurality of formation models comprise two-dimensional models or three-dimensional models.

8. A method according to claim 1, wherein:
the plurality of formation models is derived from a one-dimensional model of the geological formation determined by inversion of drilling tool response data.

9. A method according to claim 8, wherein:
the geological formation is anisotropic; the one-dimensional model of the geological formation defines (i) a number of formation layers and associated thicknesses, (ii) horizontal and vertical resistivities and (iii) formation dip; and
the plurality of formation models each define (i) a number of formation layers and associated thicknesses (ii) horizontal and vertical resistivities and (iii) formation dip.

10. A method according to claim 8, wherein:
the one-dimensional model of the geological formation is determined by inversion of tool response data that is sensitive to resistivity of the geological formation in a direction that is generally orthogonal to a central axis of the drilling tool and orthogonal to the layer structures with the heterogeneity offset laterally at variable distances relative to the position of the drilling tool.

11. A method according to claim 1, wherein:
the multi-dimensional cross-plot data is evaluated to identify a formation model of the plurality of formation models that best matches the measured directional resistivity data obtained by the drilling tool,
the distance of the heterogeneity relative to the position of the drilling tool for the identified formation model is used to determine the distance of the heterogeneity relative to the position of the drilling tool, and
multi-dimensional cross-plot data of different simulated directional resistivity data for the formation model of the plurality of formation models is evaluated for consistency in matching the measured directional resistivity data in order to identify the formation model that best matches the measured directional resistivity data.

12. A method according to claim 1, wherein:
the simulated directional resistivity data of the multi-dimensional cross-plot data is derived by combining components of a mutual impedance tensor determined from simulated tool response data; and
the measured directional resistivity data that is used to evaluate the multi-dimensional cross-plot data is derived by combining components of a mutual impedance tensor determined from measured tool response data.

13. A method according to claim 1, wherein:
each formation model of the plurality of formation models further represents a variable distance from the position of the drilling tool to a formation interface above or below the drilling tool; and
the evaluation of the multi-dimensional cross-plot data is used to determine distance from the position of the drilling tool to the formation interface above or below the drilling tool.

14. A method according to claim 13, wherein:
the multi-dimensional cross-plot data is evaluated to identify a formation model of the plurality of formation models that best matches the measured directional resistivity data; and
the distance of the position of the drilling tool to the formation interface above or below the drilling tool for the identified formation model of the plurality of formation models is used to determine the position of the drilling tool to the formation interface above or below the drilling tool.

15. A method according to claim 1, wherein:
the multi-dimensional cross-plot data is derived from particular simulated directional resistivity measurements that are sensitive to resistivity of the geological formation in a direction that is generally orthogonal to a central axis of the drilling tool and orthogonal to the layer structures with the heterogeneity offset laterally at variable distances relative to the position of the drilling tool.

16. A system for drilling a wellbore that traverses a geological formation, the system comprising:
a drilling tool with a bottom-hole assembly that includes a drill bit and at least one drilling module configured to obtain measured directional resistivity data for measured depth positions along the trajectory of the wellbore while drilling the wellbore;
a computer processing system configured to perform a number of operations for a respective measured depth position of the drilling tool, which include,
(i) deriving a plurality of formation models that characterize the geological formation, wherein the plurality of formation models represents layer structures with a heterogeneity offset laterally at variable distances relative to a position of the drilling tool, and wherein the plurality of formation models have variable distance from the drilling tool to the heterogeneity as well as variability in at least one additional model parameter, and deriving multidimensional cross-plot data of different models wherein the distance between the tool location and the heterogeneity as well as the offset of the tool location to the layer above the tool are varied over certain predefined ranges,
(ii) deriving simulated directional resistivity data of the at least one drilling module based on the plurality of formation models,
(iii) combining or selecting simulated directional resistivity data derived from the plurality of formation models for processing as multi-dimensional cross-plot data, wherein the multi-dimensional cross-plot data is derived from particular simulated directional resistivity measurements comprising simulated directional resistivity measurements that are sensitive to resistivity of the geological formation in a lateral direction relative to the drilling tool and simulated directional resistivity measurements that are sensitive to resistivity of the geological formation in the direction of layering, and (iv) using the measured directional resistivity data obtained by the at least one drilling module to evaluate the multi-dimensional cross-plot data and determine distance of the heterogeneity relative to the position of the drilling tool;

(v) determining a drilling direction of the drilling tool based on the determined distance of the heterogeneity relative to the position of the drilling tool to avoid the heterogeneity that is laterally offset with respect to the position of the drilling tool during the drilling process; and (vi) sending the determined drilling direction to a control unit in communication with the computer processing system and the drilling tool.

a control unit configured to control a drilling direction of the drilling tool based on the determined distance of the heterogeneity relative to the position of the drilling tool to avoid the heterogeneity that is laterally offset with respect to the position of the drilling tool while drilling the wellbore.

17. A system according to claim 16, wherein:
certain pairs of the simulated directional resistivity data derived from the plurality of formation models are combined or selected for processing as two-dimensional cross-plot data; and
measured directional resistivity data obtained by the at least one drilling module that corresponds to the certain pairs of the simulated directional resistivity data is used to evaluate the two-dimensional cross-plot data to determine distance of the heterogeneity relative to the position of the drilling tool.

18. A method according to claim 16, wherein:
certain N-tuples of the simulated directional resistivity data derived from the plurality of formation models are combined or selected for processing as N-dimensional cross-plot data, where N is an integer greater than three; and
measured directional resistivity data obtained by the at least one drilling module that corresponds to the certain N-tuples of the simulated directional resistivity data is used to evaluate the N-dimensional cross-plot data to determine distance of the heterogeneity relative to the position of the drilling tool.

19. A system according to claim 16, wherein:
the computer processing system includes computer memory that stores a representation of the position of the drilling tool relative to the heterogeneity based on the determined distance of the heterogeneity relative to the position of the drilling tool.

20. A system according to claim 16, wherein:
the computer processing system is configured to evaluate the multi-dimensional cross-plot data to identify a formation model of the plurality of formation models that best matches the measured directional resistivity data obtained by the at least one drilling module, and the distance of the heterogeneity relative to the position of the drilling tool for the identified formation model is used to determine the distance of the heterogeneity relative to the position of the drilling tool.

21. A system according to claim 20, wherein:
the computer processing system is configured to evaluate multi-dimensional cross-plot data of different simulated directional resistivity data for the identified formation model for consistency in matching the measured directional resistivity data in order to identify the formation model that best matches the measured directional resistivity data.

22. A system according to claim 16, wherein:
the simulated directional resistivity data of the multi-dimensional cross-plot data is derived by combining components of a mutual impedance tensor determined from simulated tool response data; and
the measured directional resistivity data obtained by the at least one drilling module that is used to evaluate the multi-dimensional cross-plot data is derived by combining components of a mutual impedance tensor determined from measured tool response data.

23. A system according to claim 16, wherein:
the multi-dimensional cross-plot data is derived from particular simulated directional resistivity measurements that are sensitive to resistivity of the geological formation in a direction that is generally orthogonal to a central axis of the drilling tool and orthogonal to the layer structures with the heterogeneity offset laterally at variable distances relative to the position of the drilling tool.

24. A system according to claim 16, wherein the at least one drilling module that obtains measured directional resistivity data is a logging-while-drilling module.

25. A method according to claim 1, wherein controlling the drilling direction of the drilling tool comprises adjusting the drilling direction of the drilling tool to avoid the heterogeneity.

* * * * *